United States Patent
Shishido et al.

(10) Patent No.: US 7,029,179 B2
(45) Date of Patent: Apr. 18, 2006

(54) BEARING UNIT, AND MOTOR USING SAME

(75) Inventors: Yuji Shishido, Kanagawa (JP); Toshio Hashimoto, Tokyo (JP); Kiyoyuki Takada, Chiba (JP)

(73) Assignee: Sony Corporation, (JP)

( * ) Notice: Subject to any disclaimer, the term of this patent is extended or adjusted under 35 U.S.C. 154(b) by 304 days.

(21) Appl. No.: 10/450,851

(22) PCT Filed: Oct. 18, 2002

(86) PCT No.: PCT/JP02/10853

§ 371 (c)(1),
(2), (4) Date: Jun. 18, 2003

(87) PCT Pub. No.: WO03/036111

PCT Pub. Date: May 1, 2003

(65) Prior Publication Data

US 2004/0042695 A1    Mar. 4, 2004

(30) Foreign Application Priority Data

Oct. 24, 2001   (JP) .............................. 2001-326509

(51) Int. Cl.
    *F16C 17/10*   (2006.01)
(52) U.S. Cl. .................... 384/107; 384/112
(58) Field of Classification Search ............. 384/107, 384/112; 360/99.08, 98.07; 310/90
    See application file for complete search history.

(56) References Cited

U.S. PATENT DOCUMENTS

| 6,172,847 B1 | 1/2001 | Sakatani et al. |
| 6,307,293 B1 | 10/2001 | Ichiyama |
| 6,316,857 B1 * | 11/2001 | Jeong ........................... 310/90 |
| 6,513,979 B1 * | 2/2003 | Mori et al. ................... 384/107 |
| 2004/0028299 A1 * | 2/2004 | Shishido et al. ............. 384/107 |

FOREIGN PATENT DOCUMENTS

JP           6-22619 A1        3/1994

(Continued)

OTHER PUBLICATIONS

International Search Report mailed Dec. 24, 2002.

*Primary Examiner*—Thomas R. Hannon
(74) *Attorney, Agent, or Firm*—Rader, Fishman & Grauer PLLC; Ronald P. Kananen

(57) ABSTRACT

A bearing unit is provided which supports a shaft (51) rotatably. It includes the shaft (51), a radial bearing (55) to support the shaft (51) circumferentially, a thrust bearing (58) to support the shaft (51) at one of thrusting-directional ends of the latter, a housing (56) having disposed therein the radial bearing (55) and thrust bearing (58) supporting together the shaft (51) and which is filled with a viscous fluid (67), and a spacer member (65) disposed inside the housing (56) to keep a gap defined between the end face of the radial bearing (55) and one side of a radial projection (54) included in the shaft (51). On the end face of the radial breading (55) opposite to one side of the radial projection (54), there is formed a first dynamic pressure producing recess (63) which produces a dynamic pressure by the viscous fluid. Also, on the side of the thrust bearing (58) opposite to the other side of the radial projection (54), there is formed a second dynamic pressure producing recess (64) which produces a dynamic pressure by the viscous fluid. As the shaft (51) rotates, the viscous fluid is circulated through the first and second dynamic pressure producing recesses (63, 64) to produce a dynamic pressure between the shaft and the radial and thrust bearings, respectively. The space member (65) provided as above permits to control the gap between the radial projection (54) and first and second dynamic pressure producing recesses (63, 64), respectively, with a high accuracy.

46 Claims, 18 Drawing Sheets

FOREIGN PATENT DOCUMENTS

| | | |
|---|---|---|
| JP | 6-178490 A1 | 6/1994 |
| JP | 10-196646 A1 | 7/1998 |
| JP | 11-27895 A1 | 1/1999 |
| JP | 11-332172 A1 | 11/1999 |
| JP | 2000-310225 A1 | 11/2000 |
| JP | 2001-20946 A1 | 1/2001 |
| JP | 2001-140864 A1 | 5/2001 |
| WO | WO-0065591 A1 | 11/2000 |

* cited by examiner

BEARING UNIT, AND MOTOR USING SAME

TECHNICAL FIELD

The present invention relates to a bearing unit for supporting a shaft rotatably or for supporting a rotating body rotatably on a shaft, and a motor using the bearing unit.

BACKGROUND ART

The electronic apparatuses using a motor therein include information recording/playback apparatuses. The application of the hard disc drive unit included in such information recording/playback apparatuses has become wider and wider. Namely, it is used not only as a recorder in a large information processor and desktop personal computer, but also in electronic apparatuses such as a notebook-sized personal computer, smaller-size portable terminal, etc.

Recently, there is available a PC (personal computer) card type hard disc drive unit whose size is approximately the size of a PC card-sized IC (integrated circuit) memory card or a card type modem. When using the PC card type hard disc drive unit, the user inserts it into a notebook-sized PC or portable terminal through a PC card slot provided in the latter.

The hard disc drive unit is provided with a spindle motor to drive a hard disc which records information signals. The spindle motor supports a spindle rotatably by means of a bearing unit. The bearing unit uses a dynamic-pressure fluid bearing whose frictional resistance is small and which allows the spindle to rotate with less load. Such a dynamic-pressure fluid bearing unit will be described with reference to FIG. 1.

In FIG. 1, the bearing unit using the dynamic-pressure fluid bearing is generally indicated with a reference 1060. The bearing unit 1060 shown in FIG. 1 is to support a shaft generally indicated with a reference 1061. This shaft 1061 consists mainly of a shaft body 1068 and a radial projection 1069 formed at one end (thrusting-directional end) of the shaft body 1068 in the form of a disc larger in diameter than the shaft body 1068. The bearing unit 1060 itself includes a radial bearing 1062 which supports the shaft body 1068 of the shaft 1061 circumferentially of the latter, a thrust bearing 1063 which supports the radial projection 1069 formed at the thrusting-directional end of the shaft 1061, and a housing 1064 which contains and supports the radial bearing 1062 and thrust bearing 1063.

The radial bearing 1062 has formed in the inner surface thereof opposite to the outer surface of the shaft body 1068 a pair of first dynamic pressure producing recesses 1062a. Also the radial bearing 1062 has a second dynamic pressure producing recess 1062b formed in the end surface thereof opposite to the radial projection 1069 of the shaft 1061. The thrust bearing 1063 has a third dynamic pressure producing recess 1063a formed in the surface thereof opposite to the radial projection 1069 of the shaft 1061. Each of these dynamic pressure producing recesses 1062a, 1062b and 1063a is a herringbone-shaped recess formed from a V-shaped pair of recesses joined to each other by a coupling recess in the rotating direction of the shaft 1061.

The housing 1064 containing and supporting the radial bearing 1062 and thrust bearing 1063 which support together the shaft body 1068 is formed to have a cylindrical shape open at either end thereof. The housing 1064 is closed by a bottom closing member 1065 at the end thereof where the thrust bearing 1063 is disposed. At the end (top end) of the housing 1064 opposite to the end where the thrust bearing 1063 is disposed, there is installed a top closing member 1066 in which a shaft insertion hole 1067 is formed through which the body 1068 of the shaft 1061 is passed.

The shaft 1061 is rotatably supported in the housing 1064 with the body 1068 thereof being received in the radial bearing 1062 and the radial projection 1069 provided at the bottom end of the shaft 1061 being supported on the thrust bearing 1063. The shaft 1061 has the top end portion of the body 1068 thereof projected out of the housing 1064 through the shaft insertion hole 1067.

The housing 1064 is filled with a lubricant which is a viscous fluid. When the shaft 1061 is rotated, the lubricant is circulated through the first and second dynamic pressure producing recesses 1062a and 1062b to produce a dynamic pressure.

A joint 1071 between the housing 1064 filled with the viscous fluid and the top closing member 1066 and a joint 1072 between the housing 1064 and bottom closing member 1065, are completely sealed with an adhesive to prevent the lubricant filled in the housing 1064 from leaking out. The inner surface of the top closing member 1066 is applied with a surfactant to prevent the lubricant from moving from the shaft insertion hole 1067 to outside the housing 1064 under the action of a centrifugal force developed due to the rotation of the shaft 1061.

As mentioned above, the shaft 1061 used in the bearing unit 1060 includes the shaft body 1068 and disc-shaped radial projection 1069, and there is a large gap 1070 between the inner surface of the housing 1064 and end face of radial projection 1069.

In the dynamic-pressure fluid bearing unit 1060 of this type, the gap between the radial projection 1069 of the shaft 1061 and the radial bearing 1062 and that between the radial projection 1069 and thrust bearing 1063 have to be extremely uniform with an accuracy as high as several micrometers for example in order to surely produce a dynamic pressure when the shaft 1061 is being rotated. If these gaps are too large, the dynamic pressure of the viscous fluid, produced in the first and second dynamic pressure producing recesses 1062a and 1062b when the shaft 1061 is rotated, will not be sufficiently effective. In addition, if the gaps are not uniform, the shaft 1061 will run out very variably.

The large gap 1070 in the bearing unit 1060 shown in FIG. 1 may cause the dynamic pressure developed due to the rotation of the shaft 1061 to be insufficient, and causes the shaft 1061 to run out very badly. To keep the viscous fluid within the housing 1064 without any leakage, the joints 1071 and 1072 between the housing and the bottom closing member 1065 and top closing member 1066 provided at the open ends of the housing 1064 are sealed with the adhesive and the top closing member 1066 is applied at the inner surface thereof with the surfactant. Because of such a construction, however, the number of parts is increased and the assembling process is complicated. Also, the sealing with the adhesive is difficult to manage and not so reliable.

DISCLOSURE OF THE INVENTION

Accordingly, the present invention has an object to overcome the above-mentioned drawbacks of the related art by providing a novel bearing unit, and a motor using the bearing unit.

The present invention has another object to provide a bearing unit smaller in number of parts, easier to assemble and more reliable, and a motor using the bearing unit.

The present invention has still another object to provide a bearing unit in which a shaft or a member supported on the shaft can be rotated stably and smoothly and a motor using the bearing unit.

The present invention has yet another object to provide a bearing unit in which a viscous fluid such as a lubricant or the like filled in a housing can be prevented from leaking out, and a motor using the bearing unit.

The present invention has still yet another object to provide a bearing unit installable easily and positively in a predetermined position such as a stator of a motor or the like.

The present invention has also another object to provide a bearing unit in which static electricity developed at a rotating portion such as a shaft or the like can surely be discharged to outside to positively protect an electronic apparatus using the bearing unit, and a motor using the bearing unit.

The above object can be attained by providing a bearing unit including, according to the present invention, a shaft consisting of a body having a circular section and a disc-shaped radial projection formed at one end of the shaft body and having a larger diameter than the shaft body; a radial bearing to support the shaft circumferentially of the latter; a thrust bearing disposed opposite to the radial projection of the shaft to support the shaft at one of thrusting-directional ends of the latter; a housing having disposed therein the radial and thrust bearings which support together the shaft, filled with a viscous fluid, and having a closed structure except for a shaft insertion hole through which the shaft is introduced; and a spacer member disposed in the housing to keep a gap between the end face of the radial bearing and one side of the radial projection of the shaft; there being formed on either one side of the radial projection opposite to the end face of the radial bearing or the end face of the radial bearing opposite to the one side of the radial projection a dynamic pressure producing means for producing a dynamic pressure by the viscous fluid; and there being formed on either the side of the thrust bearing opposite to the other side of the radial projection or the other side of the radial projection a dynamic pressure producing means for producing a dynamic pressure by the viscous fluid.

In the above bearing unit, the gap between the end face of the radial bearing and one side of the radial projection can be kept accurately by the spacer member to produce a stable dynamic pressure in each dynamic pressure producing means.

In the above bearing unit according to the present invention, there is formed on the inner surface of the radial bearing opposite to the shaft body a dynamic pressure producing means for producing a dynamic pressure by the viscous fluid.

Because of the dynamic pressure producing means also provided in the radial bearing as above, the shaft can be supported in all radial and thrusting directions by the dynamic pressures produced in the dynamic pressure producing means, so that the shaft can rotate with less load.

In this bearing unit according to the present invention, a gap defined between the shaft and inner surface (wall surface) of the shaft insertion hole is sufficiently small to prevent the viscous fluid filled in the housing from leaking out of the housing. Thus, the viscous fluid is prevented from leaking or flying out through the gap.

The housing is formed as one piece by molding a synthetic resin.

Either the inner surface of the shaft insertion hole formed in the housing or the outer surface of the body of the shaft opposite to the inner surface of the shaft insertion hole is tapered to increase the gap defined between the outer surface of the shaft body and inner surface of the shaft insertion hole as the gap goes to outside the housing. This tapering permits to draw the viscous fluid filled in the housing into the housing, which will assure a more positive prevention of the viscous fluid from leaking out of the housing.

The viscous fluid is filled in the housing up to at least the gap defined between the outer surface of the body of the shaft and inner surface of the shaft insertion hole.

The spacer member is composed of a cylindrical portion which is to be fixed to the inner surface of the housing and a toroidal sleeve formed integrally with the cylindrical portion to project inwardly and radially of the cylindrical portion.

The cylindrical portion of the spacer member is partially exposed to outside through a hole formed in the housing.

The radial bearing and spacer member may be formed integrally with each other.

Also, the housing and spacer member may be formed integrally with each other.

The shaft is a rotating shaft supported by the radial and thrust bearings rotatably in relation to the housing.

Also, the shaft may be fixed while the housing may be rotatable in relation to the shaft with the radial and thrust bearings interposed between the shaft and housing.

The end portion of the housing in which the thrust bearing is disposed is formed from a synthetic resin and joined, by welding, to the housing body formed from the synthetic resin and in which the radial bearing is disposed.

Also, the end portion of the housing in which the thrust bearing is disposed may be formed, by out-sert molding, on and integrally with the housing body in which the radial bearing is disposed.

The end portion of the housing in which the thrust bearing is disposed is formed integrally with the housing body from a synthetic resin whose molding temperature is lower than a temperature the housing body in which the radial bearing is disposed can resist.

The radial bearing should desirably be formed from a sintered metal.

The shaft may be composed of a metallic body and a radial projection may be formed from a synthetic resin and installed integrally to the metallic shaft body. In this case, the radial projection may be formed from a sintered metal and installed integrally to the metallic shaft body.

By providing on the housing of the bearing unit a fixing means for mechanically fixing the housing to a counterpart object, the housing can be installed securely to the counterpart object via an accurate positioning.

The shaft, viscous fluid, radial bearing and housing form together a discharge path to outside the housing to discharge static electricity to outside.

Also the above object can be attained by providing a bearing unit including, according to the present invention, a shaft consisting of a body having a circular section and a disc-shaped radial projection formed at one end of the shaft body and having a larger diameter than the shaft body; a radial bearing to support the shaft circumferentially of the latter; a thrust bearing disposed opposite to the radial projection of the shaft to support the shaft at one of thrusting-directional ends of the latter; and a housing having disposed therein the radial and thrust bearings which support together the shaft, filled with a viscous fluid, and having a closed structure except for a shaft insertion hole through which the shaft is introduced; the housing including a first compartment to receive and hold the radial bearing, a second compartment to receive and hold the thrust bearing, a radial projection compartment formed between the radial and thrust bearings to receive the radial projection of the shaft rotatably, and a partition member provided in a position where the first compartment and radial projection compartment are to be parted from each other. There is formed on either the side of the partition member opposite to the radial projection of the shaft or the side of the radial projection opposite to the partition member a dynamic pressure producing means for producing a dynamic pressure by the viscous fluid.

In the above bearing unit, there is provided on the inner surface of the radial bearing opposite to the shaft body a dynamic pressure producing means for producing a dynamic pressure by the viscous fluid.

Also, there is formed on either the side of the thrust bearing opposite to the radial projection or the side of the radial projection opposite to the thrust bearing a dynamic pressure producing means for producing a dynamic pressure by the viscous fluid.

Also the above object can be attained by providing a motor including a rotor and stator and provided with a bearing unit which supports the rotor rotatably in relation to the stator, the bearing unit included in the motor including, according to the present invention, a shaft consisting of a body having a circular section and a disc-shaped radial projection formed at one end of the shaft body and having a larger diameter than the shaft body; a radial bearing to support the shaft circumferentially of the latter; a thrust bearing disposed opposite to the radial projection of the shaft to support the shaft at one of thrusting-directional ends of the latter; a housing having disposed therein the radial and thrust bearings which support together the shaft, filled with a viscous fluid, and having a closed structure except for a shaft insertion hole through which the shaft is introduced; and a spacer member disposed in the housing to keep a gap between the end face of the radial bearing and one side of the radial projection of the shaft; there being formed on the end face of the radial bearing opposite to one side of the radial projection a first dynamic pressure producing means for producing a dynamic pressure by the viscous fluid; and there being formed on the side of the thrust bearing opposite to the other side of the radial projection a second dynamic pressure producing means for producing a dynamic pressure by the viscous fluid.

Also the above object can be attained by providing a motor including a rotor and stator and provided with a bearing unit which supports the rotor rotatably in relation to the stator, the bearing unit included in the motor including, according to the present invention, a shaft consisting of a body having a circular section and a disc-shaped radial projection formed at one end of the shaft body and having a larger diameter than the shaft body; a radial bearing to support the shaft circumferentially of the latter; a thrust bearing disposed opposite to the radial projection of the shaft to support the shaft at one of thrusting-directional ends of the latter; and a housing having disposed therein the radial and thrust bearings which support together the shaft, filled with a viscous fluid, and having a closed structure except for a shaft insertion hole through which the shaft is introduced; the housing including a first compartment to receive and hold the radial bearing, a second compartment to receive and hold the thrust bearing, a radial projection compartment formed between the radial and thrust bearings to receive the radial projection of the shaft rotatably, and a partition member provided in a position where the first compartment and radial projection compartment are to be parted from each other; and there being formed on the side of the partition member opposite to the radial projection of the shaft a dynamic pressure producing means for producing a dynamic pressure by the viscous fluid.

These objects and other objects, features and advantages of the present invention will become more apparent from the following detailed description of the best mode for carrying out the present invention when taken in conjunction with the accompanying drawings.

BEST MODE FOR CARRYING OUT THE INVENTION

Embodiments of the bearing unit according to the present invention and those of the motor using the bearing unit will be explained with reference to the accompanying drawings.

Prior to proceeding to the explanation of the bearing unit according to the present invention and motor using the bearing unit, there will be described an electronic apparatus in which the motor using the bearing unit according to the present invention is used as a drive unit.

The above electronic apparatus is a disc drive unit which is installed in a computer being an information processing apparatus to compute various kinds of information or which is used as an external storage unit for a computer. The disc drive unit is designed very small and thin, and thus used being inserted in a PC card slot of a notebook-sized personal computer.

Figure 1:
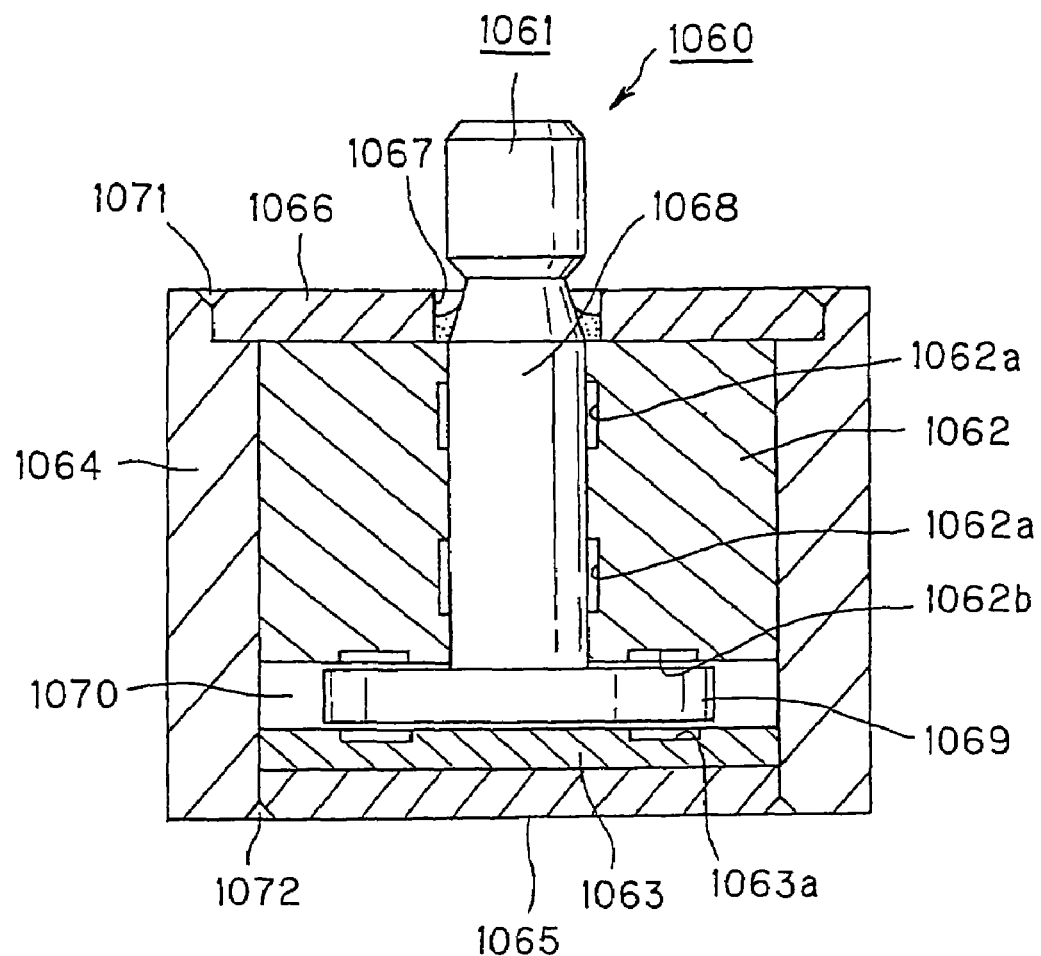
FIG. 1 is a sectional view of a conventional bearing unit.
Figure 2:
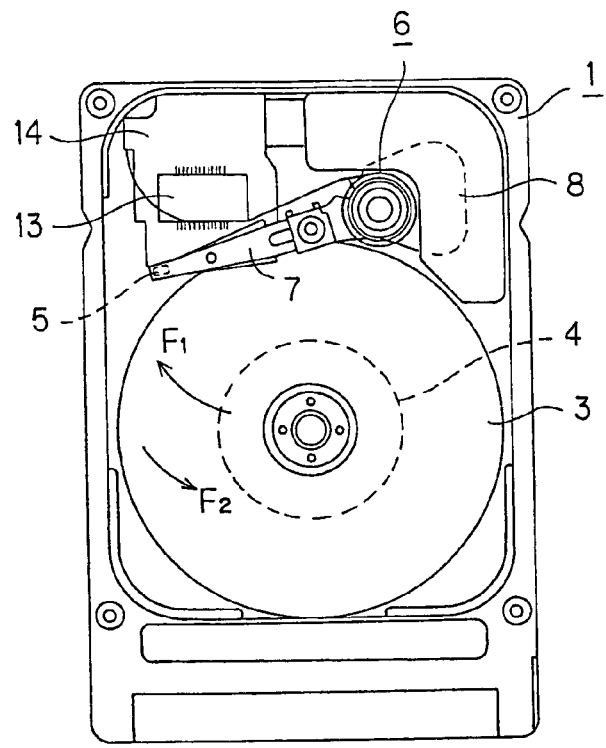
FIG. 2 is a plan view of a disc drive unit as an example of the information recorder/player in which the motor using the bearing unit according to the present invention is used.
Figure 3:
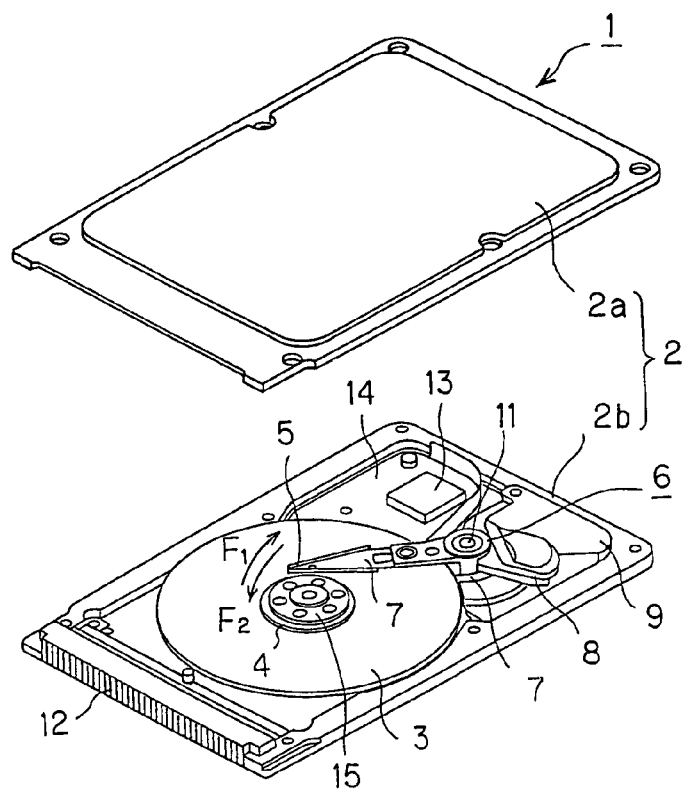
FIG. 3 is an exploded perspective view of the disc drive unit in FIG. 2, showing its internal mechanism.
Figure 4:
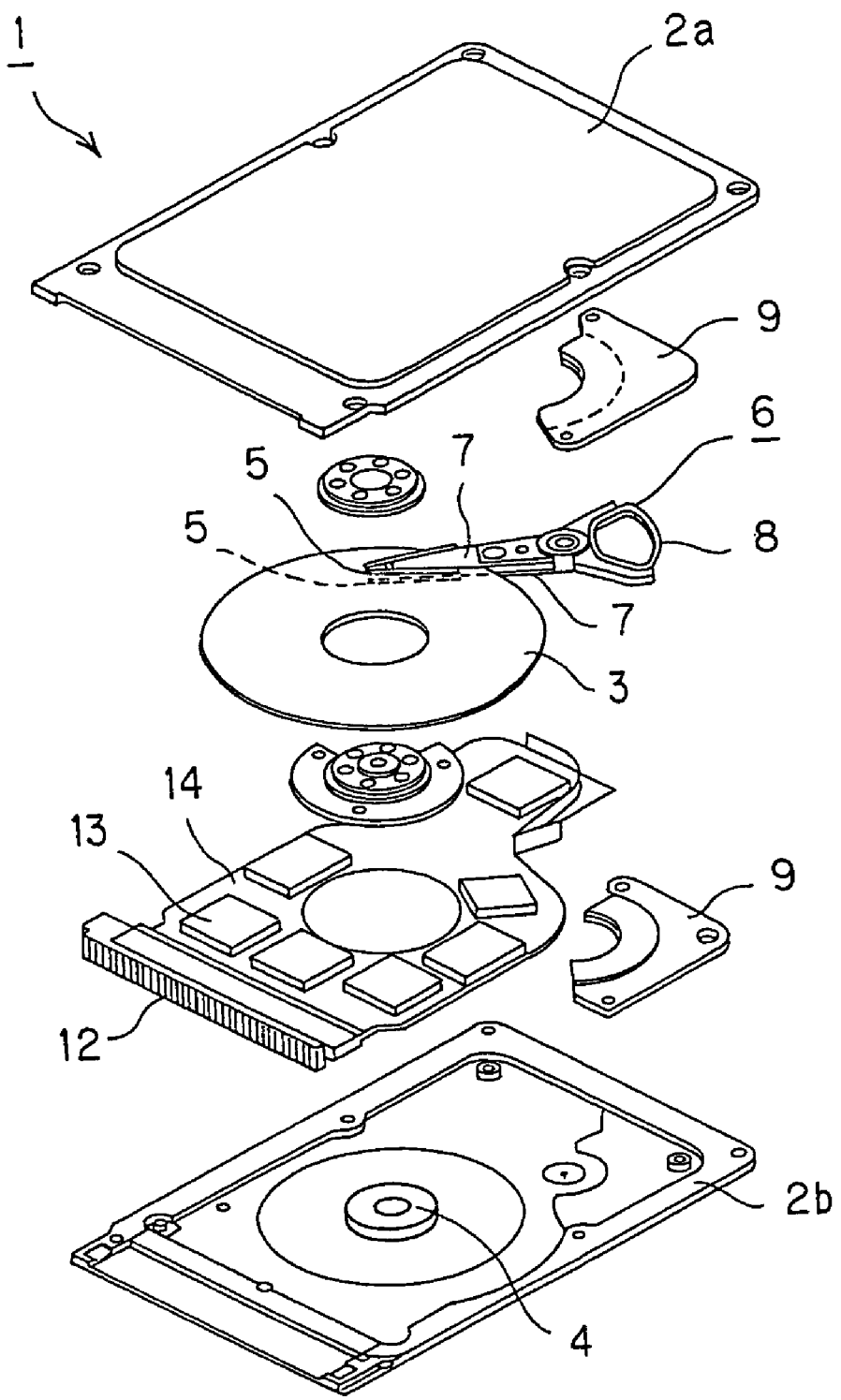
FIG. 4 is also an exploded perspective view of the disc drive unit in FIG. 2, providing further details of the internal mechanism.

FIGS. 2 to 4 show together the disc drive unit using the motor according to the present invention. The disc drive unit is generally indicated with a reference 1. As shown, the disc drive unit 1 includes a casing 2 as the main body, a hard disc 3 being a magnetic recording medium disposed in the casing 2, a spindle motor 4 using the bearing unit according to the present invention and which drives to rotate the hard disc 3, a magnetic head 5 which scans the signal recording area of the hard disc 3 being rotated by the spindle motor 4 to write or read information signal to or from the hard disc 3, and a rotating actuator 6 to support the magnetic head 5.

The casing 2 is formed from a pair of casing halves 2a and 2b, upper and lower, by joining them end to end.

The hard disc 3 is fixed to a rotor 15 of the spindle motor 4 as shown in FIG. 3, and rotates along with the rotor 15.

The rotating actuator 6 supporting the magnetic heads 5 which scan the hard disc 3 includes a pair of head support arms 7 extending over each side of the hard disc 3, and a voice coil 8. The voice coil 8 is provided between a pair of magnets 9 disposed inside the casing 2 as shown in FIG. 4. The voice coil 8 and magnets 9 form together a voice coil motor. When the rotating actuator 6 is supplied at the voice coil 8 thereof with an exciting current, a magnetic field developed around the voice coil 8 and magnetic fields developed around the pair of magnets 9 act on each other to produce an electromagnetic force with which the head support arms 7 are rotated about a pivot 11 in the directions of arrows $F_1$ and $F_2$ shown in FIGS. 2 and 3. As the head support arms 7 are rotated by the voice coil motor, the magnetic heads 5 supported by the head support arms 7, respectively, are positioned on an arbitrary recording track on the hard disc 3 being rotated and write information signal to the hard disc 3 or read information signal already recorded in the hard disc 3. It should be noted that each of the magnetic heads 5 is a one using a magneto-resistive element.

Note that the disc drive unit 1 is provided at one end of the casing 2 with a connection terminal 12 which provides an electrical connection to a computer or the like. Inside the casing 2, there are provided a system LSI (large-scale integrated circuit) 13 and a circuit board 14 having mounted thereon ordinary electronic parts such as IC (integrated circuit), etc.

Figure 5:
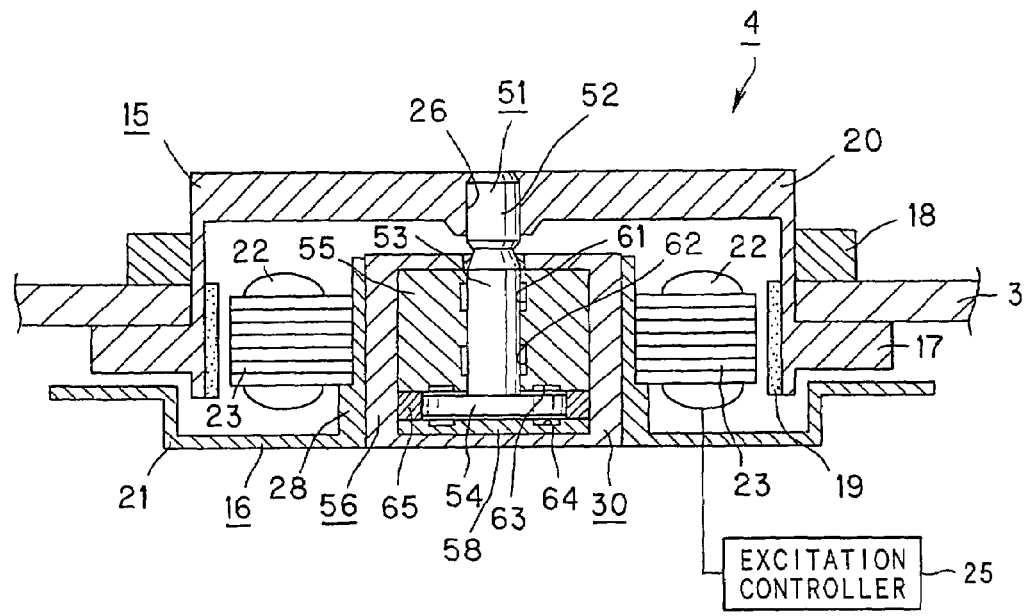
FIG. 5 is a sectional view of a spindle motor with the bearing unit according to the present invention positioned and installed to the stator.

The spindle motor 4 to rotate the hard disc 3 is provided with a rotor 15 and stator 16 as shown in FIG. 5.

The rotor 15 includes a rotor housing 20 having formed thereon a turntable 17 on which the hard disc 3 is mounted, a chucking member 18 working with the turntable 17 to clamp the hard disc 3, and a rotor magnet 19.

Note that the rotor 15 has the rotor housing 20 thereof supported rotatably to a bearing unit according to the present invention, generally indicated with a reference 30 and which will further be described later.

The rotor housing 20 is formed from a magnetic material such as iron, and has a fitting hole 26 formed in the center thereof. The rotor housing 20 is press-fitted at the fitting hole 26 thereof on a fixing portion 52 of the shaft 51 which functions as a spindle supported by the bearing unit 30. Thus, the rotor housing 20 is rotated along with the shaft 51 of the bearing unit 30.

The turntable 17 is formed protruded from the perimeter of the rotor housing 20. It receives the hard disc 3. The hard disc 3 is supported at the inner circumferential portion thereof by the turntable 17 and chucking member 18 forced to the turntable 17 to be rotatable along with the rotor housing 20. It should be noted that the chucking member 18 is formed like a ring from a stainless steel for example.

The rotor magnet 19 provided on the cylindrical inner wall of the rotor housing 20 is formed like a ring and alternately magnetized as N and S poles circumferentially. The rotor magnet 19 is formed from a sintered neodymium-iron-boron (Nd—Fe—B), for example.

The stator 16 included together with the rotor 15 in the spindle motor 4 includes a stator housing 21, a housing 56 of the bearing unit 30, a excitation coil 22, an iron core 23 on which the excitation coil 22 is wound, and a flexible printed wiring board (not shown) having mounted thereon a drive circuit to control the rotation of the spindle motor 4, etc.

The stator housing 21 is made of a stainless steel for example, and has the flexible printed wiring board fixed thereto by bonding. The flexible printed wiring board is electrically connected to the excitation coil 22. The excitation coil 22 has U-, V- and W-phase terminals and a common terminal thereof led out of the stator housing 21 via the flexible printed wiring board. The flexible printed wiring board is electrically connected to an excitation controller 25 via a connector.

The iron core 23 having the excitation coil 22 wound thereon has nine poles for example. On the other hand, the rotor magnet 19 has for example twelve poles including the N and S poles, formed circumferentially. When the excitation coil 22 is supplied with an exciting current in a predetermined pattern of excitation from the excitation controller 25, a magnetic field developed around the excitation coil 22 thus excited and magnetic fields developed around the rotor magnet 19 pair of magnets 9 act on each other to continuously rotate the rotor 15 about the shaft 51 in relation to the stator 16.

The stator housing 21 has a cylindrical portion 28 formed to rise from it. The bearing unit 30 including the shaft 51 as the spindle of the spindle motor 4 is inserted and installed in the cylindrical portion 28. That is, the cylindrical portion 28 secures the bearing unit 30.

Figure 6:
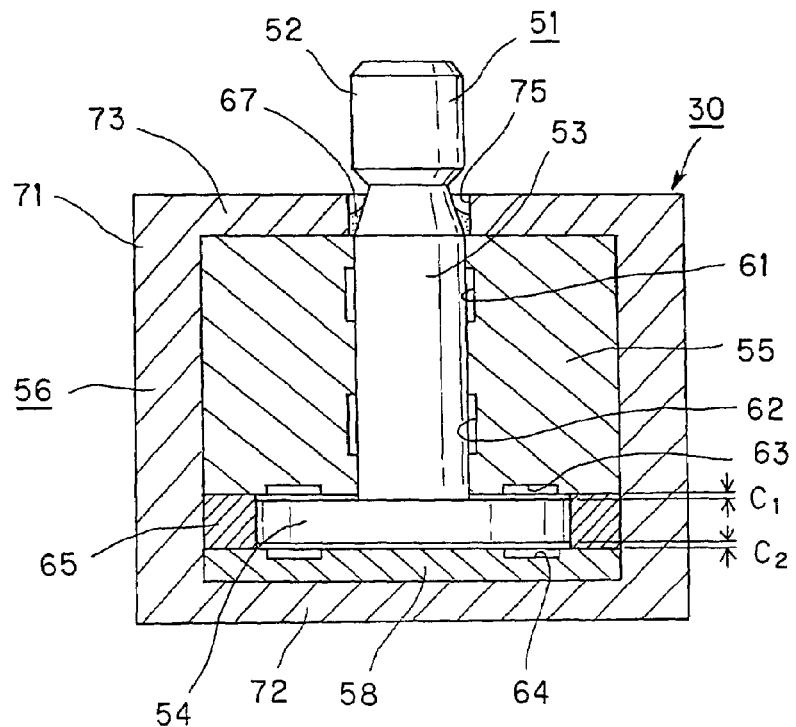
FIG. 6 is an axial-sectional view of the bearing unit according to the present invention.

As shown in FIG. 6, the bearing unit 30 according to the present invention, provided with the shaft 51 which is also the spindle of the spindle motor 4 as above. The shaft 51 consists of a body 53 and a radial projection 54 formed like a disc at one end of the shaft body 53 and larger in diameter than the shaft body 53. In addition, the bearing unit 30 includes a radial bearing 55 to support the shaft 51 circumferentially of the latter, a thrust bearing 58 to support the radial projection 54 provided at one of the thrusting-directional ends of the shaft 51, and a housing 56 which receives and holds the radial and thrust bearings 55 and 58.

Note that when the shaft 51 is installed in the housing 56 while being supported by the radial and thrust bearings 55 and 58, the disc-shaped radial projection 54 provided at one end of the shaft 51 abuts one end face of the radial bearing 55 to prevent the shaft 51 from going out of the housing 56.

In the inner surface of the radial bearing 55 to support the shaft 51 rotatably circumferentially of the latter, there is formed a pair of first dynamic pressure producing recesses 61 and 62 opposite to the outer surface of the shaft body 53 to produce a dynamic pressure. Also, a second dynamic pressure producing recess 63 is formed in one end face of the radial bearing 55 opposite to the radial projection 54 of the shaft 51. Further, a third dynamic pressure producing recess 64 is formed on the side of the thrust bearing 58 opposite to the radial projection 54 of the shaft 51. These first to third dynamic pressure producing recesses 61, 62, 63 and 64 form together a dynamic pressure producing mechanism.

Figure 7:
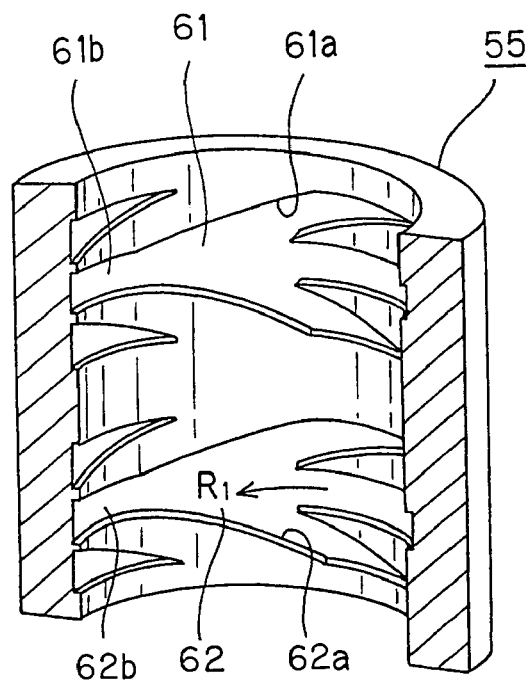
FIG. 7 is a perspective view of a radial bearing in the bearing unit in FIG. 6, showing dynamic pressure producing recesses formed in the inner surface of the radial bearing.

As shown in FIG. 7, each of the first dynamic pressure producing recesses 61 and 62 formed in the inner surface of the radial bearing 55 oppositely to the outer surface of the shaft body 53 includes pairs of recesses 61*a* (62*a*), each pair forming a "V" shape, and a coupling recess 61*b* (62*b*) coupling two successive V-shaped pairs of recesses 61*a* (62*a*) with each other circumferentially of the inner wall of the radial bearing 55. That is, each of the first dynamic pressure producing recesses 61 and 62 is formed as a herringbone-shaped recess. In each of the first dynamic pressure producing recesses 61 and 62, the V-shape of each pair of recesses 61*a* (62*a*) is directed at the bottom end thereof in the direction of rotation $R_1$ of the shaft 51. In this embodiment, the first dynamic pressure producing recesses 61 and 62 are provided in one pair, upper and lower, in parallel with each other perpendicularly to the axis of the cylindrical radial bearing 55. The number and size of the dynamic pressure producing recesses 61 and 62 thus formed in the radial bearing 55 are appropriately selected depending upon the diameter and length of the radial bearing 55.

Figure 8:
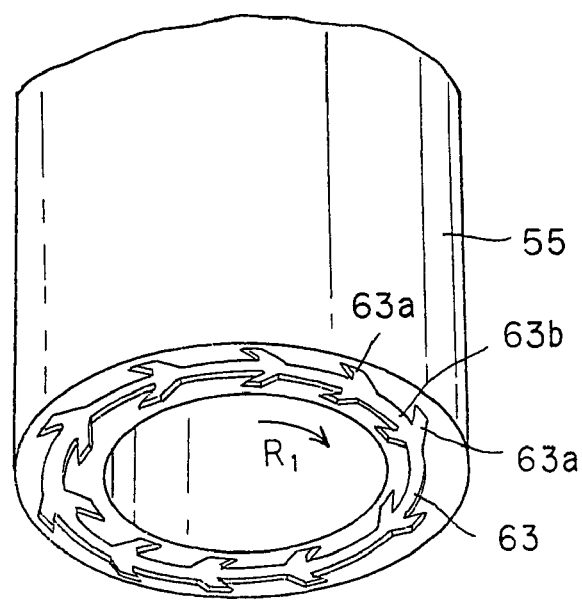
FIG. 8 is a perspective view of the radial bearing in the bearing unit in FIG. 6, showing a dynamic pressure producing recess formed in one end face of the radial bearing.

Also the second dynamic pressure producing recess 63 formed in one end face and along the outer surface edge of the radial bearing 55 and it includes pairs of recesses 63*a*, each pair forming a "V" shape, and a coupling recess 63*b* coupling two successive V-shaped pairs of recesses 63*a* with each other circumferentially of the radial bearing 55, as shown in FIG. 8. That is, the second dynamic pressure producing recess 63 is formed as a herringbone-shaped recess. In the second dynamic pressure producing recesses 63, the V-shape of each pair of recesses 63*a* is directed at the bottom end thereof in the direction of rotation $R_1$ of the shaft 51.

Figure 9:
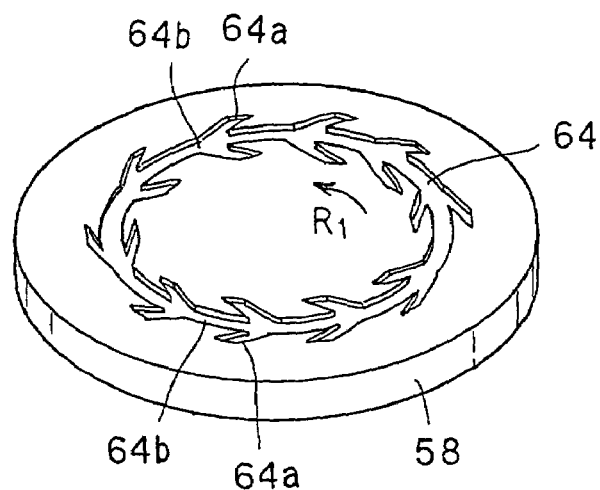
FIG. 9 is a perspective view of a thrust bearing in the bearing unit in the bearing unit in FIG. 6, showing a dynamic pressure producing recess formed in the thrust bearing.

Also the third dynamic pressure producing recess 64 formed on one side of the thrust bearing 58 opposite to the radial projection 54 of the shaft 51 and along the outer surface edge of the thrust bearing 58, and it includes pairs of recesses 64*a*, each pair forming a "V" shape, and a coupling recess 64*b* coupling two successive V-shaped pairs of recesses 64*a* with each other circumferentially of the thrust bearing 58, as shown in FIG. 9. That is, the third dynamic pressure producing recess 64 is formed as a herringbone-shaped recess. In the third dynamic pressure producing recesses 64, the V-shape of each pair of recesses 64*a* is directed at the bottom end thereof in the direction of rotation $R_1$ of the shaft 51.

When the shaft 51 supported by the radial bearing 55 and thrust bearing 58 continuously rotates inside the housing 56, a lubricant 67 being a viscous fluid filled in the housing 56 is circulated through the first to third dynamic pressure producing processes 61 to 64 to produce dynamic pressures between the shaft 54 and the radial and thrust bearings 55 and 58. The dynamic pressure thus supports the shaft 51. That is, the radial and thrust bearings 55 and 58 work as a dynamic-pressure fluid bearing. The dynamic pressure produced as the shaft rotates minimizes the coefficient of a friction between the shaft 51 and the radial and thrust bearings 55 and 58 to assure a smooth rotation of the shaft 51.

Note that the radial bearing 55 is formed from a porous sintered metal and the thrust bearing 58 is formed from a metal such as stainless steel or the like.

The bearing unit 30 according to the present invention further includes a toroidal spacer member 65 provided between one end face of the radial bearing 55 and the thrust bearing 58. The spacer member 65 is designed to have an inside diameter larger than the outside diameter of the radial projection 54 formed at one end of the shaft 51. The outer surface of the spacer member 65 is fixed to the inner surface of the housing 56. The spacer member 65 functions as follows:

In the bearing unit 30 as shown in FIG. 6, a gap $C_1$ defined between the side of the radial projection 54 of the shaft 51 opposite to one end face of the radial bearing 55 and one end face of the radial bearing 55 and a gap $C_2$ defined between the side of the radial projection 54 opposite to the thrust bearing 58 and the thrust bearing 58 should be kept with an extremely high accuracy. For example, in the bearing unit 30 used in the spindle motor 4 used in the aforementioned disc drive unit 1, the gaps $C_1$ and $C_2$ have to be kept with an accuracy of several micrometers to assure a stable rotation of the shaft 51. If these gaps are too large, the first to third dynamic pressure producing recesses 61 to 64 will not be sufficiently effective to produce dynamic pressures. If the gaps are not uniform, the shaft 51 will run out considerably.

On this account, in the bearing unit 30 according to the present invention, the spacer member 65 is disposed around the radial projection 54 of the shaft 51 to reduce the gap near the outer circumference of the radial projection 54, as shown in FIGS. 5 and 6, thereby minimizing the rotational run-out of the shaft 51 due to the movement of the lubricant 67 to assure a stable rotation of the shaft 51.

In the bearing unit 30 shown in FIGS. 5 and 6, the gap $C_1$ defined between the side of the radial projection 54 of the shaft 51 opposite to one end face of the radial bearing 55 and one end face of the radial bearing 55 and gap $C_2$ defined between the side of the radial projection 54 opposite to the thrust bearing 58 and the thrust bearing 58 can be kept with an accuracy of several micrometers by disposing the spacer member 65 around the radial projection 54.

Owing to the spacer member 65 thus provided, the lubricant 67 filled in the housing 56 is evenly circulated through the second dynamic pressure producing recess 63 formed in the radial bearing 55 and third dynamic pressure producing recess 64 formed in the thrust bearing 58 to effectively produce dynamic pressures in the second and third dynamic pressure producing recesses 63 and 64. Besides, since the gap C1 defined between the side of the radial projection 54 of the shaft 51 opposite to one end face of the radial bearing 55 and one end face of the radial bearing 55 and gap C2 defined between the side of the radial projection 54 opposite to the thrust bearing 58 and the thrust bearing 58 are uniform, which contributes to a reduced rotational run-out of the shaft 51. Thus, since the accuracy of the axial position of the shaft 51 in relation to the housing 56 can be made higher, the bearing unit itself and the spindle motor 4 using the bearing unit 30 can have a longer life and are more highly reliable.

The housing 56 included in the bearing unit 30 as shown in FIGS. 5 and 6 consists of a cylindrical body 71, a bottom closing member 72 formed integrally with the housing body 71 and forming one end face of the bearing unit 30, and a top closing member 73 formed integrally with the housing body 71 and forming the other end face of the bearing unit 30. The top closing member 73 has formed in the center thereof a shaft insertion hole 75 the body 53 of the shaft 51, supported rotatably by the radial bearing 55 and thrust bearing 58 provided inside the housing 56.

By making out-sert molding of a synthetic resin to encase the radial bearing 55, spacer member 65 and thrust bearing 58 stacked one on the other in this order, the housing 56 constructed as above is formed as one piece with the radial bearing 55 positioned at the inner surface side of the housing body 71, thrust bearing 58 positioned at the bottom side of the housing body 71 and with the spacer member 65 positioned between the radial and thrust bearings 55 and 58, as shown in FIG. 6. The shaft 51 has the body 53 thereof inserted in the cylindrical radial bearing 55 and thus supported by the radial and thrust bearings 55 and 58. When the shaft 51 is assembled in the one-piece housing 56, the radial projection 54 formed at one end the shaft 51 is positioned opposite to the thrust bearing 58 and the fixing portion 52 at the other end of the shaft 51 is projected out through the shaft insertion hole 75 formed in the top closing member 73 of the housing 71.

The housing 56 thus formed as one piece to encase the radial bearing 55, spacer member 65 and thrust bearing 58 and thus support the shaft 51 is filled with the lubricant 67 as a viscous fluid circulated through the first to third dynamic pressure producing recesses 61 to 64 to produce dynamic pressures when the shaft 51 is rotated.

For filling the lubricant 67 into the housing 56, the housing 56 having the shaft 51 inserted therein is immersed in a filling bath containing the lubricant 67. Next, the filling bath having the housing 56 immersed therein is vacuumized in a vacuumization apparatus. Then, the vacuumized filling bath is taken out of the vacuumization apparatus into the atmosphere. The lubricant 67 will thus be filled in the housing 56.

At this time, the lubricant 67 is so filled into the housing 56 that it will be prevented from leaking from inside the shaft insertion hole 75 to outside the housing 56 when it is expanded due to a temperature elevation, and that it will not be insufficient in amount in a gap 79 defined between the shaft 51 and inner surface of the shaft insertion hole 75 when it is reduced in volume due to a temperature fall. That is to say, the change in amount of the lubricant 67 due to a temperature change is set to within a range of the shaft insertion hole 75.

The vacuumization by a vacuumization apparatus to fill the lubricant 67 into the housing 56 will cause the pressure inside the housing 56 to be lower than the atmospheric pressure, with the result that the lubricant 67 will be prevented from easily leaking out of the housing 56.

In the bearing unit 30 according to the present invention, in case the radial bearing 55 is made of a sintered metal, it will be impregnated with the lubricant 67, and also the first to third dynamic pressure producing recesses 61 to 64 for producing the dynamic pressure when the shaft 51 is rotated will be filled with the lubricant 67. Say, the lubricant 67 will be filled in all the gaps and voids in the housing 56.

Note that the synthetic resin used to mold the housing 56 is not limited to any special one but should desirably be a one which will increase the angle of contact when repelling the lubricant 67 filled in the housing 56. Since the housing 56 has the thrust bearing 66 formed integrally therewith, it should desirably be formed from a synthetic resin excellent in lubricity. Therefore, the housing 56 should preferably be formed from a fluorinated synthetic resin such as polyimide, polyamide, polyacetal or the like, or a synthetic resin such as polytetrafluoroethylene teflon, nylon or the like. Further, a synthetic resin such as PC (polycarbonate), ABS (acrylonitrile butadiene styrene) or the like may be used for this purpose. Moreover, the housing 56 may be formed from a liquid crystal polymer which can be molded with an extremely high accuracy.

Figure 10:
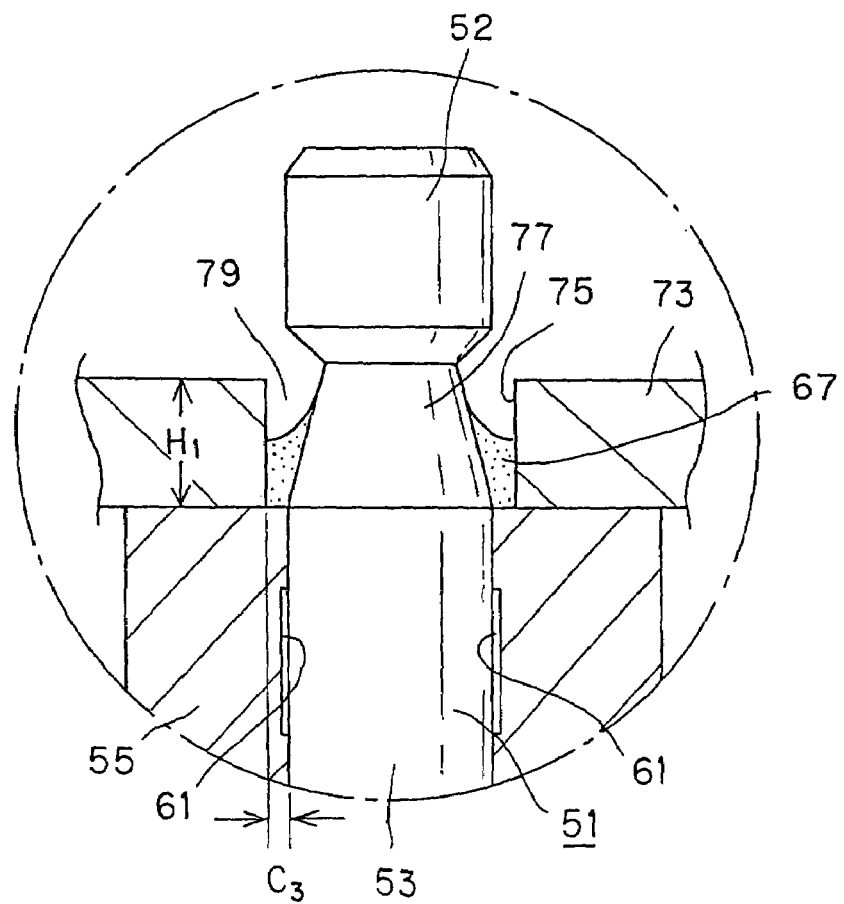
FIG. 10 is a sectional view of a gap defined between the inner surface of the radial bearing and inner surface of a shaft insertion hole formed in a housing of the bearing unit.

Note that the shaft insertion hole 75 formed in the top closing member 73 of the housing 56 is formed to have a somewhat larger inside diameter than the outside diameter of the shaft body 53 so that the body 53 of the shaft 51 inserted through the shaft insertion hole 75 can be rotated with no contact or friction with the inner surface of the shaft insertion hole 75. More specifically, the shaft insertion hole 75 is formed to define between the inner surface thereof and outer surface of the shaft body 53 a gap 79 whose size C3 is sufficient to prevent the lubricant 67 filled in the housing 56 from leaking out of the housing 56, as shown in FIGS. 6 and 10. As seen from the foregoing, the top closing member 73 defining, along with the outer surface of the shaft 51, the shaft insertion hole 75 to provide the gap 79 which prevents the lubricant 67 filled in the housing 56 from leaking. The top closing member 73 functions as an oil sealing.

Since the top closing member 73 integral with the housing 56 is formed from a synthetic resin such as polyimide, polyamide or nylon, so it assures an angle of about 60 deg. at which the inner surface of the shaft insertion hole 75 is in contact with the lubricant 67. The bearing unit 30 according to the present invention can thus assure a larger angle of contact of the lubricant 67 with the inner surface of the shaft insertion hole 75 in the top closing member 73 of the housing 56, without having to apply any surfactant to the top closing member 73 providing the oil sealing which includes the inner surface of the shaft insertion hole 75. Hence, the lubricant 67 can be prevented from being caused by a centrifugal force developed as the shaft 51 rotates to move to outside the housing 56 through the shaft insertion hole 75.

Further, the shaft 51 is tapered (as indicated at a reference 77) at a surface portion thereof opposite to the inner surface of the shaft insertion hole 75. The tapered portion 77 increases the gap 79 defined between the outer surface of the shaft 51 and inner surface of the shaft insertion hole 75 outwardly of the housing 56. The tapered portion 77 imparts a pressure gradient in the gap 79 defined between the outer surface of the shaft 51 and inner surface of the shaft insertion hole 75, such that there will develop a force to cause the lubricant 67 filled in the housing 56 to move inwardly of the housing 56. Since the lubricant 67 is thus moved inwardly of the housing 56 when the shaft 51 rotates, it will positively enter the first to third dynamic pressure producing recesses 61 to 64 in the radial and thrust bearings 55 and 58 formed as a dynamic-pressure fluid bearing to produce a dynamic pressure which will assure a stable supporting of the shaft 51 and prevent the lubricant 67 filled in the housing 56 from leaking out of the latter.

In the bearing unit 30 according to the present invention, the lubricant 67 entering the first to third dynamic pressure producing recesses 61 to 64 to produce a dynamic pressure is filled into the housing 56 up to the gap 79 defined between the tapered portion 77 of the shaft 51 and inner surface of the shaft insertion hole 75, as shown in FIGS. 6 and 10. That is, the lubricant 67 is filled into clearances inside the housing 56 and further impregnated into the radial bearing 55 formed from a sintered metal.

The gap 79 defined between the tapered portion 77 of the shaft 51 and inner surface of the shaft insertion hole 75 will further be described herebelow. The minimum size of the gap 79 is equivalent to the size $C_3$ defined between the outer surface of the shaft 51 and inner surface of the shaft insertion hole 75. The size $C_3$ of the gap 79 should desirably be 20 to 200 μm, and more preferably be on the order of 100 μm. If the size $C_3$ of the gap 79 is smaller than 20 μm, it is difficult to mold a synthetic resin into the one-piece housing 56 of the bearing unit 30 with a high accuracy. Also, if the size $C_3$ of the gap 79 is larger than 200 μm, when the bearing unit 30 is applied with a shock, the lubricant 67 filled in the housing 56 will be caused to fly out of the housing 56, namely, the shock resistance of the housing 56 will be lower.

The above shock resistance of the housing 56 against fly-out of the lubricant 67 when applied with a shock will be indicated with a symbol G. The shock resistance G is given by a following equation (1):

$$G = (12\gamma \cos \beta / 2\rho c^2)/g \qquad (1)$$

where

γ: Surface tension of the lubricant
β: Angle of contact of the lubricant
ρ: Density of the lubricant
c: Gap between the shaft and inner surface of shaft insertion hole
g: Free-fall speed As seen from the above equation (1), the shock resistance G is inversely proportional to the square of the size c of the gap 79.

Also, a thermal expansion-caused rise of the lubricant level, indicated with a symbol h, is given by a following equation (2):

$$h = V\alpha\Delta t / 2\pi Rc \qquad (2)$$

where V: Filled amount of the lubricant
α: Thermal expansion coefficient
Δt: Temperature change
R: Radius of the shaft As known from the equation (2), the elevation of the lubricant level h is inversely proportional to the size c. So, in case the size c is decreased, the shock resistance G is improved but the level h of the lubricant 67 will be caused to violently rise due to a temperature elevation and thus the shaft insertion hole 75 will have to be deeper axially of the housing 56.

The results of calculation show that in the bearing unit 30 supporting the shaft 51 having the body 53 whose outside diameter is 2 to 3 mm, when the size $C_3$ of the gap 79 defined between the outer surface of the shaft body 53 and inner surface of the shaft insertion hole 75 is on the order of 100 μm and the shaft insertion hole 75 is about 1 mm deep ($H_1$), the housing 56 will have a shock resistance more than 1000 G and a thermal resistance of 80° C. In this case, the bearing unit 30 can prevent the lubricant 67 filled in the housing 56 from flying out of the latter, and thus it is highly reliable.

Further, since in the bearing unit 30, the tapered portion 77 of the shaft 51 increases the size $C_3$ of the gap 79 defined between the outer surface of the shaft 51 and inner surface of the shaft insertion hole 75 outwardly of the housing 56, there will take place a pressure gradient in the size $C_3$ of the gap 79 defined between the outer surface of the shaft 51 and inner surface of the shaft insertion hole 75, such that under a centrifugal force developed when the shaft 51 rotates, there will take place a force with which the lubricant 67 filled in the housing 56 is moved inwardly of the latter.

That is, in the bearing unit 30 according to the present invention, the gap 79 defined between the outer surface of the shaft 51 and inner surface of the shaft insertion hole 75 provides a surface tension seal to prevent the lubricant 67 from flying out of the housing 56.

Next, another embodiment of the bearing unit according to the present invention will be described with reference to FIGS. 11 and 12.

Figure 11:
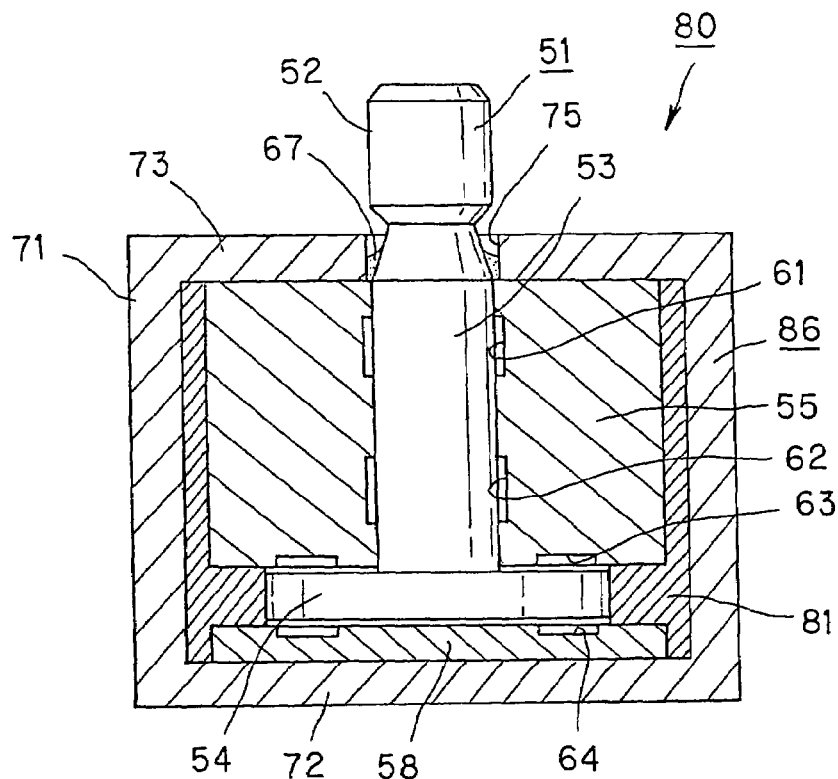
FIG. 11 is an axial-sectional view of another embodiment of the bearing unit according to the present invention.
Figure 12:
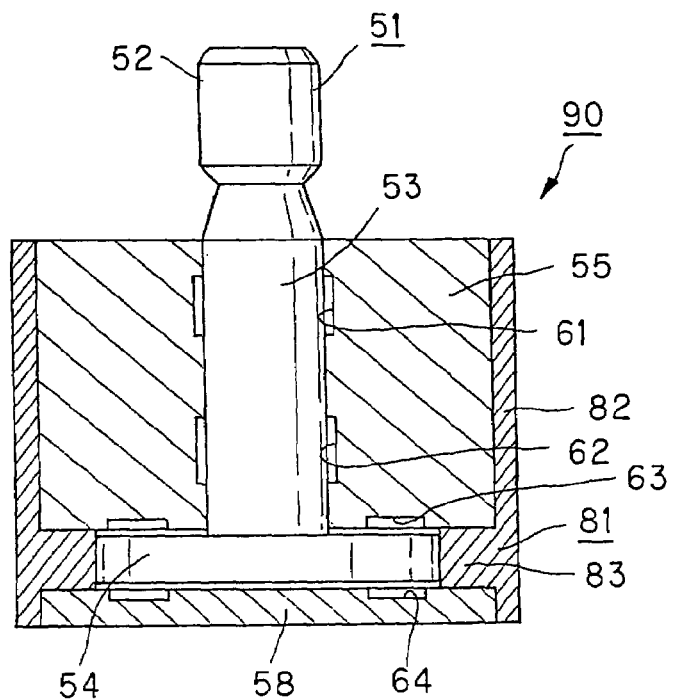
FIG. 12 is a sectional view of the bearing unit in FIG. 11, showing the shaft, radial bearing, thrust bearing and spacer member set in combination.

The bearing unit shown in FIGS. 11 and 12 is generally indicated with a reference 80. As shown, the bearing unit 80 includes a housing 86 which can be formed more easily by out-sert molding.

Note that the same or similar elements of the bearing unit 80 shown in FIGS. 11 and 12 as those in the bearing unit 30 having been described above with reference to FIG. 6 are indicated with the same or similar references as those in FIG. 6 and will not be described in further detail.

For forming the bearing unit 80 constructed as shown in FIG. 11, a subassembly 90 as shown in FIG. 12 is pre-formed. The subassembly 90 includes a shaft 51 having a radial projection 54 formed integrally therewith, radial bearing 55, thrust bearing 58 and spacer member 81. In this embodiment, the spacer member 81 includes a cylindrical body 82 and a toroidal sleeve 83 formed integrally with the cylindrical body 82. The toroidal sleeve 83 is formed projected on the inner surface of the cylindrical body 82 fully circumferentially of the latter and extending toward the outer circumferential of a radial projection 54 of the shaft 51.

As will be seen from FIG. 12, the shaft 51, radial bearing 55, spacer member 81 and the thrust bearing 58 are provisionally fixed and assembled together into the subassembly 90. A housing 86 is formed, by out-sert molding of a synthetic resin, on the subassembly 90 as shown in FIG. 11. This pre-forming of the subassembly 90 will facilitate the out-sert molding of the housing 86.

Figure 13:
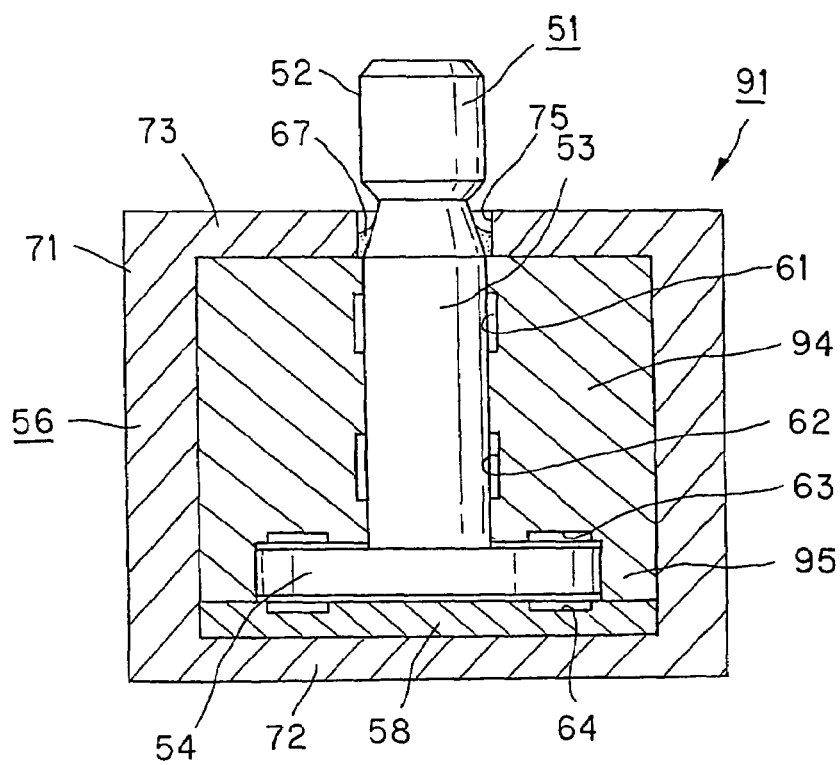
FIG. 13 is an axial-sectional view of another embodiment of the bearing unit according to the present invention.

Next, another embodiment of the bearing unit according to the present invention will be described with reference to FIG. 13. This bearing unit is generally indicated with a reference 91. It should be noted that the same or similar elements of the bearing unit 91 shown in FIG. 13 as those in the bearing unit 30 having been described above with reference to FIG. 6 are indicated with the same or similar references as those in FIG. 6 and will not be described in further detail. The bearing unit 91 is different from the bearing unit 30 shown in FIG. 6 in that it includes a radial bearing 94 formed integrally with a spacer member 95. Thus, by forming the radial bearing 94 and spacer member 95 integrally with each other, the bearing unit 91 can be formed from a smaller number of necessary elements, which contributes very much to a reduced manufacturing cost.

Figure 14:
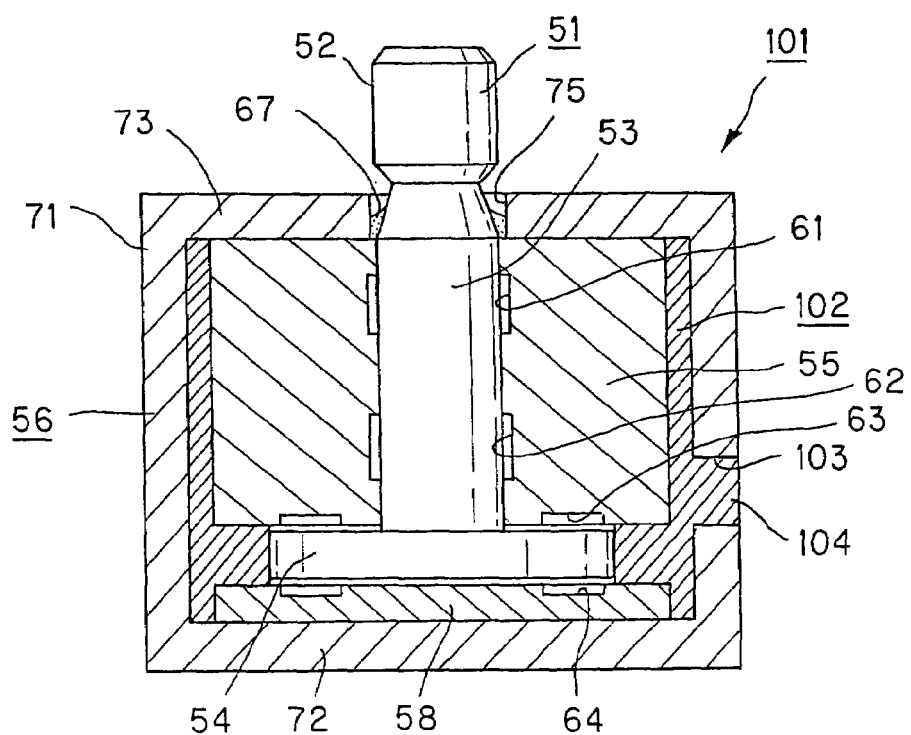
FIG. 14 is an axial-sectional view of another embodiment of the bearing unit according to the present invention.

Also, another embodiment of the bearing unit according to the present invention will be described with reference to FIG. 14. This bearing unit is generally indicated with a reference 101. It should also be noted that the same or similar elements of the bearing unit 101 as those in the bearing unit 30 having been described above with reference to FIG. 6 are indicated with the same or similar references as those in FIG. 6 and will not be described in further detail. The bearing unit 101 is different from the bearing unit 30 in FIG. 6 in that it has a spacer member 102 is partially projected (indicated as a reference 104) which is fitted in a through-hole 103 formed in a housing 56 and exposed to outside the housing 56. Having the projection 104 fitted in the through-hole 103 and thus fixed to the housing, the spacer member 102 can positively be fixed to the housing 56.

Note that the synthetic resin such as polyimide, polyamide, nylon or the like used as a material molded to form the housing 56 cannot be secured to a metal with a sufficient adhesion as the case may be. In this bearing unit 101 according to the present invention, the synthetic resin-made housing 56 is disposed at the outermost circumference and fixed, by fitting, to the metallic cylindrical portion 28 of the spindle motor 4. Therefore, the housing 56 cannot securely be joined to the cylindrical portion 28 with an adhesive.

On the other hand, the spacer member 102 disposed inside the housing 56 is formed from a metal such as iron, brass, aluminum or the like. On this account, the metallic spacer member 102 is partially projected (indicated at the reference 104) as above. When the projection 104 is exposed to outside the housing 56, the housing 56 will have a metallic portion (projection 104) which can thus be securely joined to the metallic cylindrical portion 28. Thus, the housing 56 and metallic cylindrical portion 28 can be positively joined to each other with an adhesive.

Figure 15:
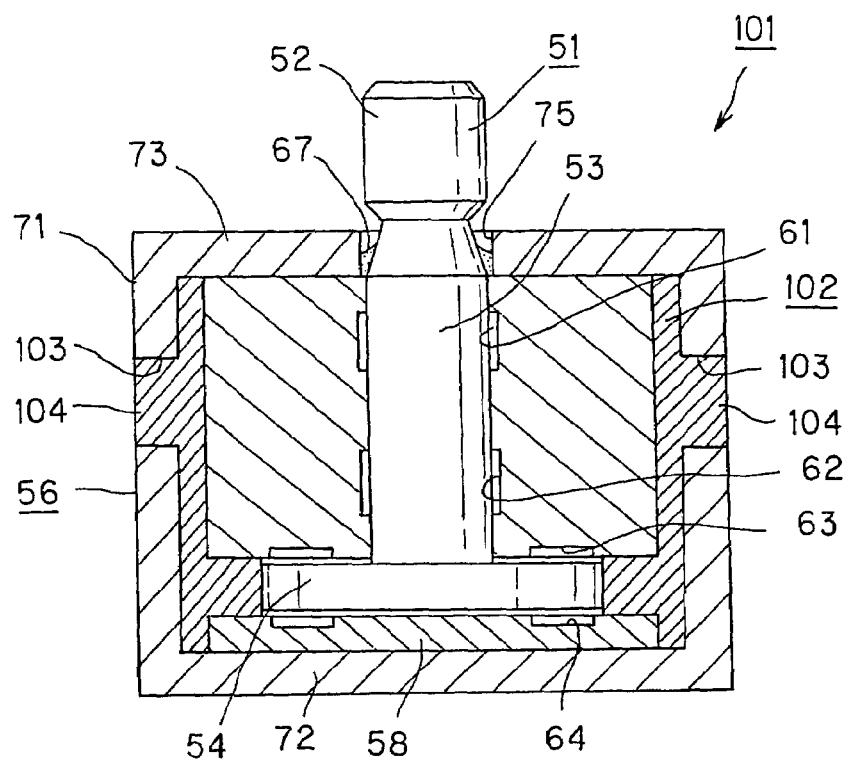
FIG. 15 is an axial-sectional view of another embodiment of the bearing unit according to the present invention.

Note that the spacer 102 may be projected at more than one portion thereof to have a plurality of such projections 104 as shown in FIG. 15. Because of the plurality of metallic projections 104 exposed to outside the housing 56, the area of the metallic portion to be in contact with the metallic cylindrical portion 28 can be increased and the housing 56 can thus be joined, with an adhesive, to the metallic cylindrical portion 28 more positively.

Another embodiment of the bearing unit according to the present invention will be described with reference to FIGS. 16 and 17. This bearing unit is generally indicated with 110. It should also be noted that the same or similar elements of the bearing unit 101 as those in the bearing unit 30 having been described above with reference to FIG. 6 are indicated with the same or similar references as those in FIG. 6 and will not be described in detail any longer.

Figure 16:
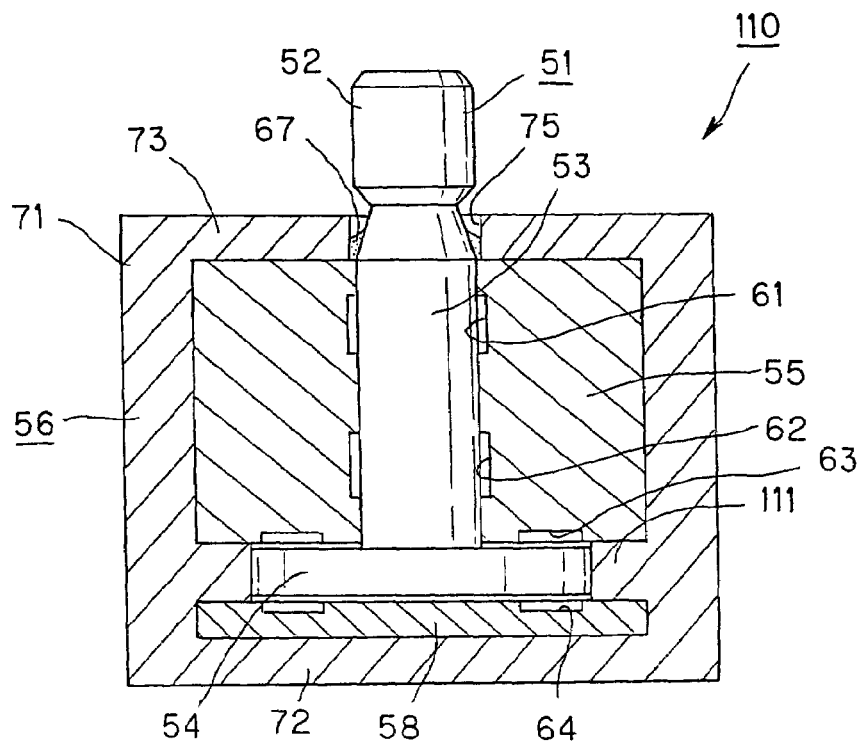
FIG. 16 is an axial-sectional view of another embodiment of the bearing unit according to the present invention.
Figure 17A:
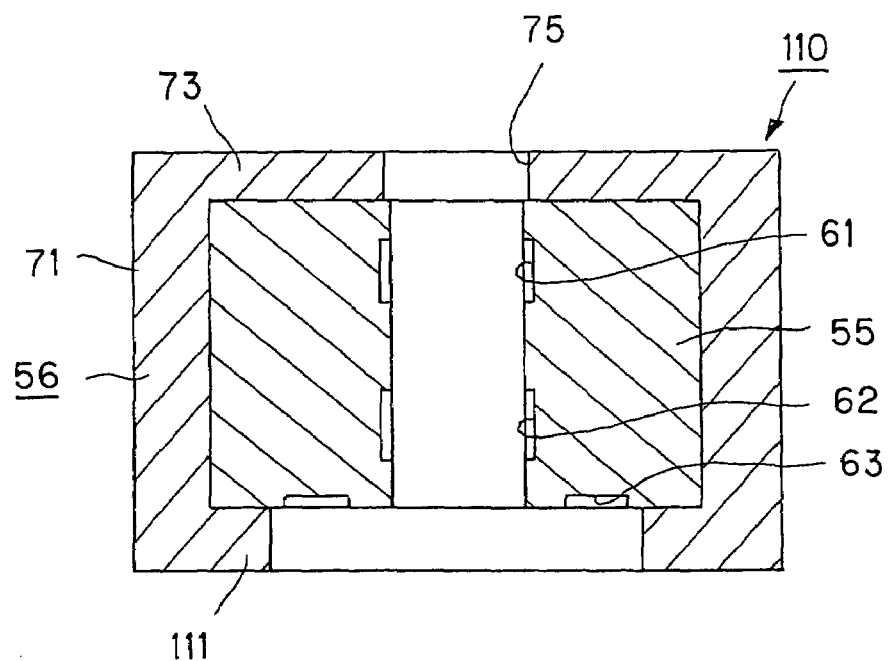
FIG. 17A is a sectional view of the bearing unit in which the housing is formed, by out-sert molding, integrally on the radial bearing.

The bearing unit 110 shown in FIG. 16 includes a housing 56 having a spacer member 111 formed integrally with the housing 56. For making such a bearing unit 110, a housing body 71 including a top closing member 73 is formed, by out-sert molding, on a radial bearing 55 in a first synthetic resin molding step as shown in FIG. 17A. At this time, a spacer member 111 is formed integrally with the housing 56.

Figure 17B:
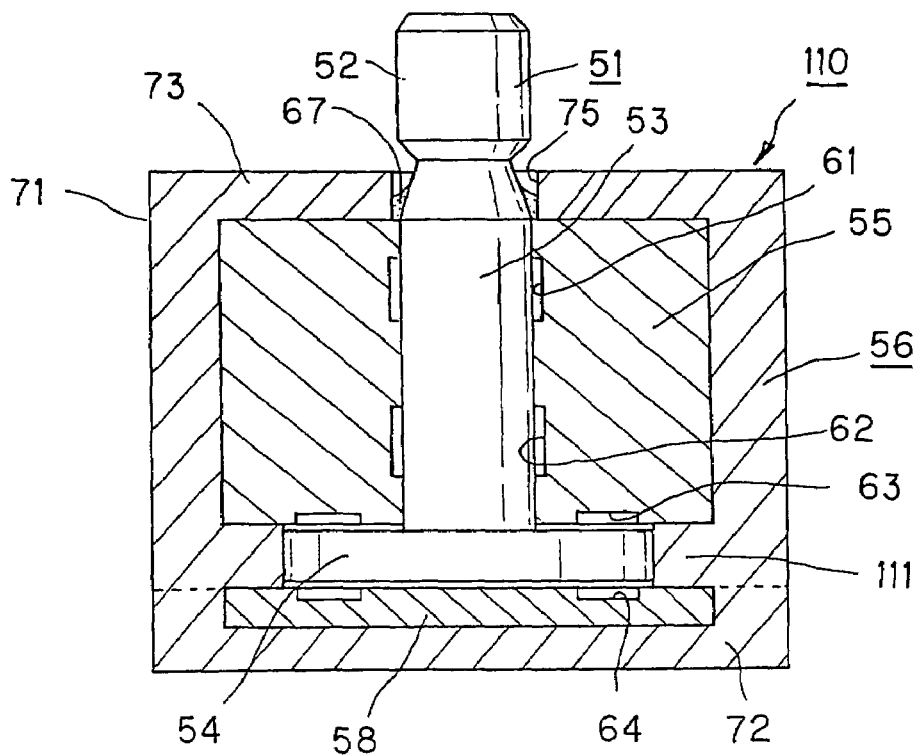
FIG. 17B is a sectional view of the bearing unit in which the bottom closing member is formed, by out-sert molding, integrally on the housing with the thrust bearing being already attached to the housing.

Next, a shaft 51 is inserted through the radial bearing 55 encased in the housing 71, a thrust bearing 58 is disposed opposite to a radial projection 54 of the shaft 51, and a synthetic resin is molded, by out-sert molding, on the housing body 71 having the thrust bearing 58 disposed therein, to thereby form the housing 56 having a bottom closing member 72 which closes the bottom of the housing body 71, as shown in FIG. 17B. Through such a molding process, a dynamic-pressure fluid bearing can easily be made which is composed of a reduced number of elements and is highly reliable.

Note that the synthetic resin molded, by the out-sert molding, on the bottom of the housing body 71 to form the bottom closing member 72 is a one which can be molded at a lower temperature than the temperature the synthetic resin forming the housing body 71 can resist. Using such a material, the housing 56 having the bottom closing member 72 formed integrally with the housing body 71 can be formed without any influence on the accuracy of molding the housing body 71 having been molded before the bottom closing member 72.

In the aforementioned bearing unit according to the present invention and a motor using this bearing unit, since the radial bearing, thrust bearing, shaft and spacer member are encased in the housing formed as one piece by molding a synthetic resin and the shaft 51 is projected to outside of the housing 56 through a gap 79 having a size $C_3$ sufficient to prevent a lubricant 67 being a viscous fluid filled in the housing 56 from leaking from inside the housing 56, as shown in FIG. 10, so it is possible to positively prevent the lubricant 67 filled in the housing 56 from leaking out of the latter, Since the lubricant 67 filled in the housing 56 can be prevented from leaking to outside the housing 56, it can be circulated through first to third dynamic pressure producing recesses 61 to 64 forming together a dynamic pressure producing mechanism. Since in the bearing unit according to the present invention, the gap $C_1$ defined between the side of the radial projection 54 of the shaft 51 opposite to one end face of the radial bearing 55 and one end face of the radial bearing 55 and gap $C_2$ defined between the side of the radial projection 54 opposite to the thrust bearing 58 and the thrust bearing 58 can be kept with an extremely high accuracy, as shown in FIG. 6, the shaft 51 is allowed to rotate stably with no run-out. Thus, the bearing unit according to the present invention can advantageously be used in an information recorder/player such as a hard disc drive unit.

Since in the bearing unit according to the present invention, the gaps $C_1$ and $C_2$ between the radial projection 54 of the rotating shaft 51 and the radial bearing 55 and thrust bearing 58, respectively, can be kept with an improved accuracy, a constant dynamic pressure can be produced as the lubricant 67 is circulated through the second and third dynamic pressure producing recesses 63 and 64, which contributes very much to a highly accurate rotation of the shaft 51. Further, since the radial bearing 55 has formed therein the first dynamic pressure producing recesses 61 and 62 through which the lubricant 67 is circulated, the shaft 51 will be supported by a dynamic-pressure fluid bearing small in coefficient of friction in both radial and thrusting directions thereof and which will allow the shaft 51 to rotate with less load. Thus, since the load to the shaft 51 supported by the dynamic-pressure fluid bearing is extremely small, a high stability of rotation can be assured even when the shaft 51 is rotated at a high speed, and also a higher reliability including a longer life can be attained.

In each of the aforementioned embodiments of the bearing unit according to the present invention, the housing 56 is formed as one piece from a synthetic resin. So, it can be formed by out-sert molding or the like, needs no assembling process and can be manufactured easily with a high precision.

Further, in each of the aforementioned bearing units, since the lubricant 67 filled in the housing 56 can be prevented from leaking and flying out, no lubricant will stain any hard disc when the bearing unit is used in a disc drive unit. Thus, the bearing unit according to the present invention will assure a high reliability of the disc drive unit.

Note that the aforementioned shaft is composed of the body and radial projection formed integrally with the shaft body but the shaft body and radial projection may be prepared separately and then joined to each other.

Figure 18:
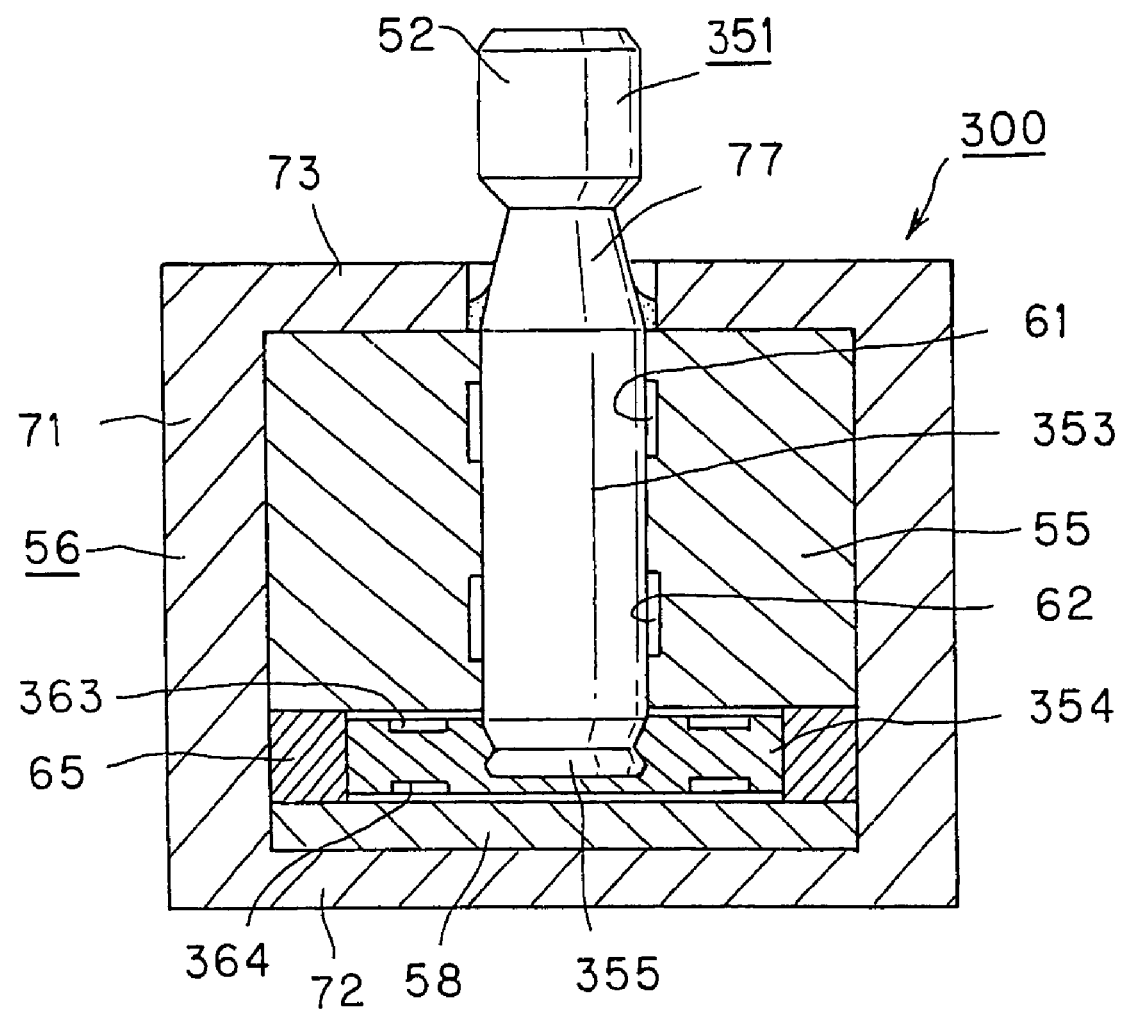
FIG. 18 is an axial-sectional view of an example of the bearing unit using a shaft composed of a body and radial projection, separate from each other.

An example of the bearing unit including a shaft composed of a body and a disc (as the radial projection in the aforementioned embodiments) prepared separately will be described herebelow with reference to FIGS. 18 to 20.

Note that the same or similar elements as those in the bearing unit shown in FIG. 6 will be indicated with the same or similar references as those in FIG. 6 and will not be described in detail any longer.

The bearing unit is generally indicated with a reference 300. A shaft 351 used the bearing unit 300 shown in FIG. 18 is formed from separate members: a straight body 353 and a disc 354. The shaft body 353 is made of a metal such as stainless steel. Since the shaft body 353 is formed straight and only tapered (as indicated with a reference 77), it can undergo centerless polishing. Namely, since the shaft body 353 can be centerless-polished, it can easily be formed accurately circular.

The disc 354 is formed integrally at one end of the shaft body 353 to form the shaft 351 by out-sert molding of a synthetic resin or a sintered metal.

Note that at the one end of the shaft body 353 where the disc 354 is formed integrally by the out-sert molding, there is formed a coupling recess 355 in which the synthetic resin or sintered metal to be out-sert molded will come. With such a coupling recess 355, the disc 354 and shaft body 353 are strongly joined to each other.

Since the disc 354 included in the shaft 351 is formed on the shaft body 353 by out-sert molding in a later process, a dynamic pressure producing recess can be formed in the disc 354 during the out-sert molding. That is, a second dynamic pressure producing recess 363 can be formed on one side of the disc 354 opposite one end face of a radial bearing 55 received and held in a housing 56, and a third dynamic pressure producing recess 364 be formed on the other side of the disc 354 opposite to a thrust bearing 58.

Figure 19:
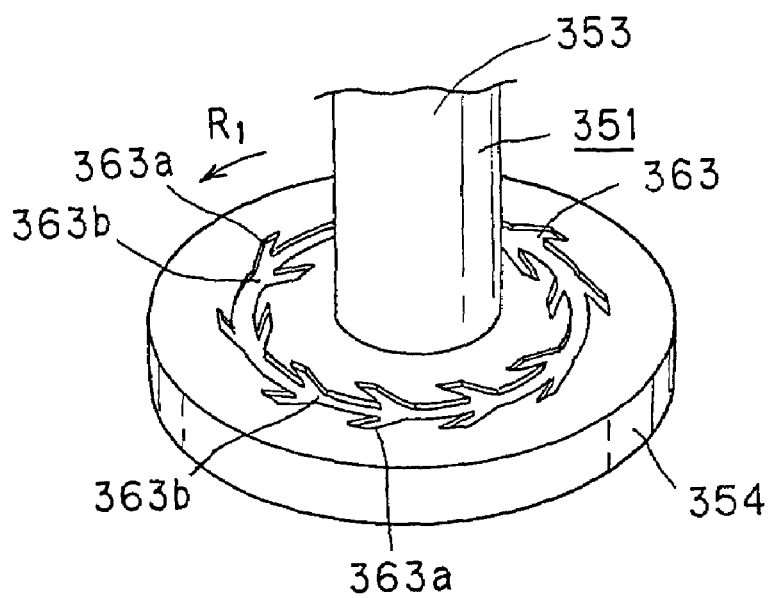
FIG. 19 is a fragmentary perspective view of a shaft with a radial projection in which a dynamic pressure producing recess is formed.

Similarly to the second dynamic pressure processing recess 63 formed in the one end face of the radial bearing 55, the second dynamic pressure producing recess 363 formed on the one side of the disc 354 is formed as a herringbone-shaped recess which is a combination of pairs of recesses 363a, each pair forming a V shape, and a coupling recess 363b coupling the V-shaped pairs of recesses 363a with each other circumferentially of the disc 354, as shown in FIG. 19. At this time, the second dynamic pressure producing recess 363 is formed such that the V shape of each pair of recesses 363a is directed at the bottom end thereof in a direction $R_1$ in which the shaft 351 rotates.

Figure 20:
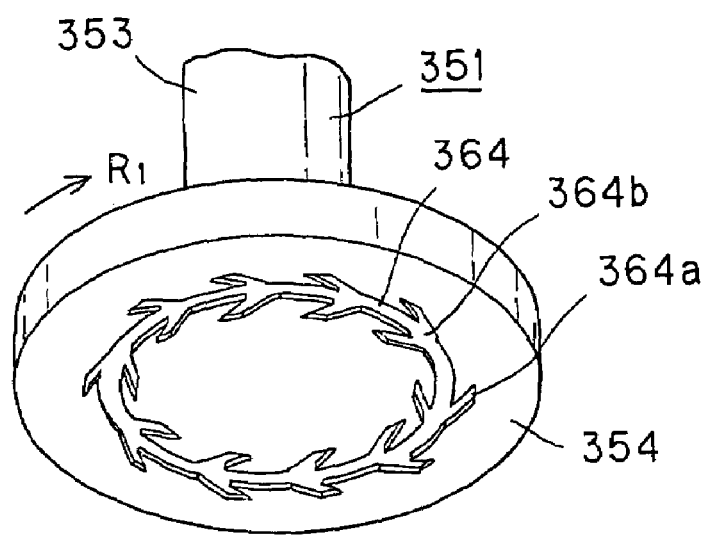
FIG. 20 is also a fragmentary perspective view of the shaft with a radial projection having a dynamic pressure producing recess formed in the bottom thereof.

Also, the third dynamic pressure producing recess 364 formed on the other side of the disc 354 opposite to the thrust bearing 58 is formed as a herringbone-shaped recess which is a combination of pairs of recesses 364a, each pair forming a V shape, and a coupling recess 364b coupling the V-shaped pairs of recesses 364a with each other circumferentially of the disc 354, as shown in FIG. 20. At this time, the third dynamic pressure producing recess 364 is formed such that the V shape of each pair of recesses 364a is directed at the bottom end thereof in a direction $R_1$ in which the shaft 351 rotates.

Since use the shaft 351 makes it unnecessary to form any dynamic pressure producing recess in the radial and thrust bearings 55 and 58, so the radial and thrust bearings 55 and 58 can be made more easily.

Note that the disc 354 may have only either the second or third dynamic pressure producing recess 363 or 364. Even in this case, there is no necessity of forming any dynamic pressure producing recess in one of the radial and thrust bearings 55 and 58. So, the bearing can be made more easily.

Also, the disc 354 may be a flat disc with no dynamic pressure producing recess being formed therein. Each the body 353 of such a shaft 351 can be formed easily, and thus the bearing unit 300 can be made more easily.

Note that the bearing unit 30 according to the present invention supports the rotor 15 on the shaft 51 and is installed in the stator housing 21 to form the spindle motor 4, as shown in FIG. 5. The bearing unit 30 has to be positioned and securely fixed in the stator housing 21.

Figure 21:
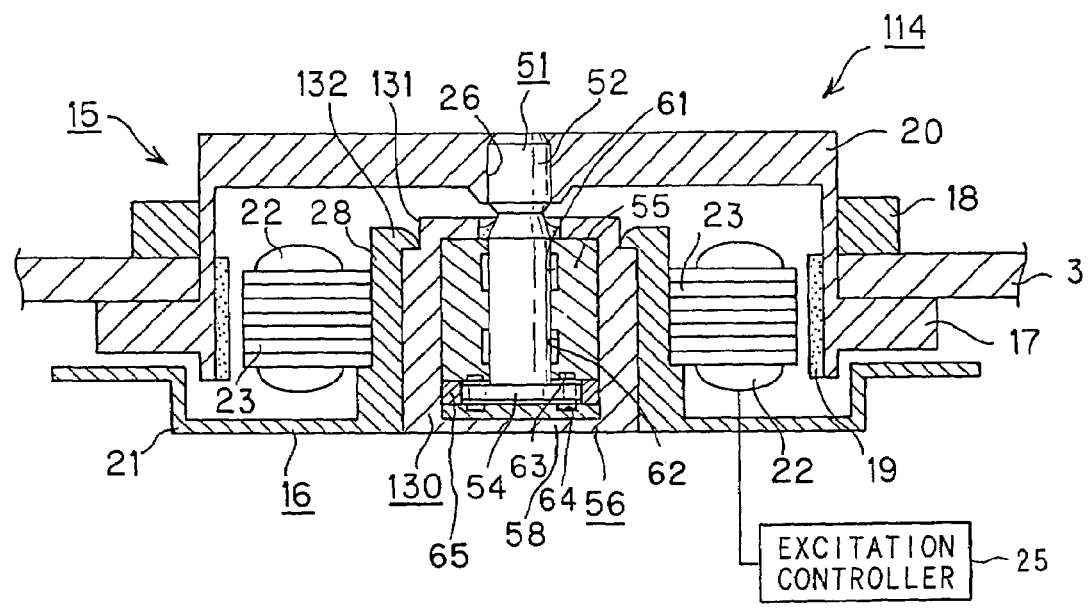
FIG. 21 is a sectional view of a spindle motor according to the present invention, having the bearing unit positioned and installed to a stator thereof.
Figure 22:
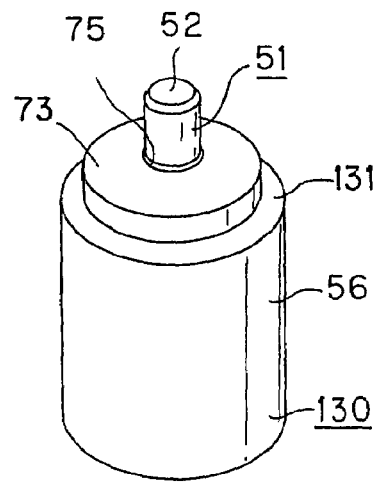
FIG. 22 is a perspective view of the bearing unit having an engagement portion formed thereon to help positioning and installing the bearing unit to the stator of the spindle motor in FIG. 21.

Next, an example of the bearing unit provided with a mechanical fixing means for allowing the bearing unit to be positioned and securely fixed to the stator housing of a spindle motor, and an example of the spindle motor using the bearing unit, will be described with reference to FIGS. 21 and 22.

Note that the same or similar elements of the spindle motor as those in the spindle motor 4 in FIG. 5 are indicated with the same or similar references as those in FIG. 6 and will not be described in detail any longer.

The spindle motor is generally indicated with a reference 114 and the bearing unit used in the spindle motor 114 is generally indicated with a reference 130. As shown in FIG. 21, the bearing unit 130 has formed on a housing 56 thereof a step 131 which provides a means for mechanically fixing the housing 56 to a stator housing 21. The step 131 is formed on the outer circumference of the housing 56 where there is provided a top closing member 73 through which the shaft 51 is projected to outside the housing 56.

Note that a cylindrical portion 28 of the stator housing 21, forming a stator 16 of the spindle motor 114, is equivalent to the housing 56 of the bearing unit 130.

With the bearing unit 130 having the engagement step 131 formed on the housing 56 being inserted in the cylindrical portion 28 provided inside the stator housing 21 formed from a metal such as stainless steel, a riveting portion 132 formed at the top of the cylindrical portion 28 is deformed for engagement on the step 131, and thus the bearing unit 130 is mechanically fixed to the stator housing 21. Owing to the riveting portion 132 formed on the top of the cylindrical portion 28 into which the housing 56 of the bearing unit 130 is to be introduced for installation of the latter in the stator housing 21, the bearing unit 130 can be positioned and fixed in place to the spindle motor 114 without any large load to the bearing unit 130.

Even in case the housing 56 of the bearing unit 130 is formed from a synthetic resin such as polyimide, polyamide, nylon or the like which cannot be secured to the metal with a sufficient adhesion, the housing 56 formed from such a synthetic resin can positively be fixed mechanically to the metallic cylindrical portion 28 since the bearing unit 130 is fixed to the cylindrical portion 28 by riveting.

The means for mechanically fixing the bearing unit according to the present invention to a motor such as a spindle motor or the like may be a thermal riveting in addition to the above-mentioned riveting. For the thermal riveting, a thermal riveting projection is provided on the housing of the bearing unit, formed from a synthetic resin, and the projection is fitted on the stator housing and thermally deformed to fix the bearing unit to the stator housing.

Also, the housing of the bearing unit may be externally threaded and the externally threaded portion of the bearing is screwed into a screw hole formed in the stator housing, thereby installing the bearing unit to the stator housing.

Further, a flat portion or a projection may be formed on the outer surface of the cylindrical housing of the bearing unit while a flat portion or engagement concavity may be formed on the cylindrical portion 28 of the stator housing, to position and fix the bearing unit to the motor stator housing.

The bearing unit used in the aforementioned spindle motor supports the shaft rotatably in relation to the housing. According to the present invention, however, the housing may be adapted to be rotatable in relation to the shaft of the bearing unit.

An example of the spindle motor using a bearing unit whose shaft is fixed or stationary will be illustrated and explained herebelow:

Note that in the following illustration and explanation, the same or similar elements of these bearing unit and spindle motor as or to those of the bearing units 30 and the spindle motors 4 using the bearing unit 30 as shown in FIG. 5 will be indicated with the same or similar references as or to those in FIG. 5 and will not be explained in detail any longer.

Figure 23:
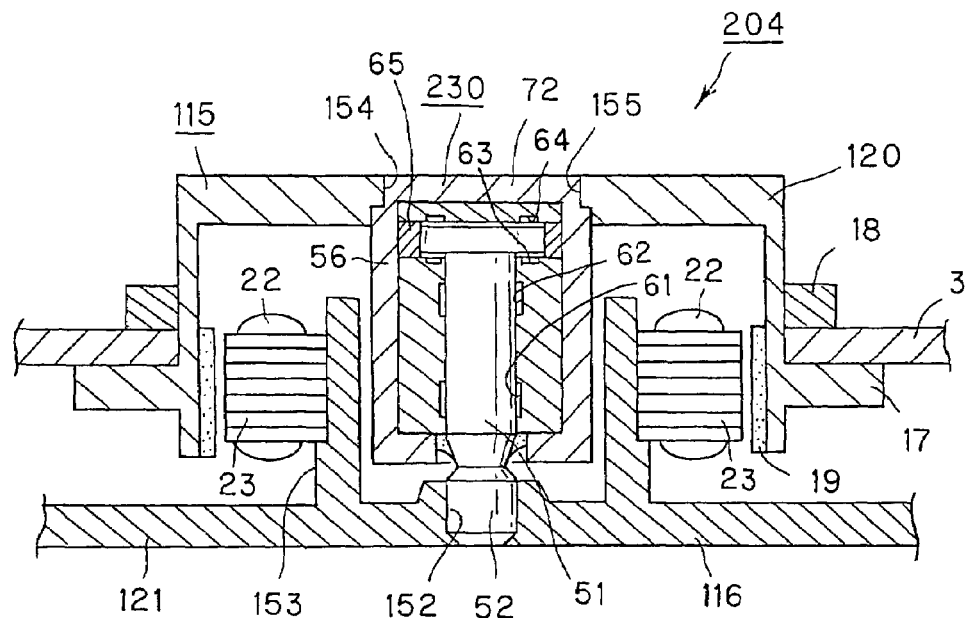
FIG. 23 is a sectional view of a spindle motor according to the present invention, using a bearing unit in which the shaft is fixed while the housing is rotatable.

The spindle motor in which the shaft of the bearing unit is fixed is generally indicated with a reference 204 in FIG. 23. As shown, in the spindle motor 204, the shaft 51 of a bearing unit generally indicated with a reference 230 is fixed to a stator housing 121. The shaft 51 is press-fitted at the fixing portion 52 thereof projecting out of the housing 56 into a fixing hole 152 formed in the stator housing 121, and fixed to the stator housing 121. With the shaft 51 being thus fixed in the bearing unit 230, the housing 56 will be supported rotatably to the shaft 51.

The stator housing 121 having the shaft 51 fixed thereto has a cylindrical coil fixture 153 formed to enclose the housing 56 of the bearing unit 230, as shown in FIG. 23. Around the coil fixture 153, there is installed an iron core 23 having an excitation coil 22 wounded thereon.

In this example, the spindle motor 204 has a rotor 115 thereof installed to the housing 56 supported rotatably to the shaft 51. The rotor housing 120 has an engagement hole 154 formed in the center thereof, and the bearing unit 230 has an engagement portion 155 formed on the outer surface of the bottom closing member 72 of the housing 56 thereof, as shown in FIG. 23. With the engagement portion 155 being press-fitted in the engagement hole 154, the rotor 115 is installed integrally with the housing 56 to be rotatable.

Note that the engagement hole 154 is stepped at the inner surface thereof and the engagement portion 155 is correspondingly stepped at the outer surface thereof to position the rotor 115 in relation to the housing 56 to which the rotor 115 is to be fixed.

Also in the spindle motor 204, a rotor magnet 19 is disposed on the inner surface of the cylindrical portion of the rotor housing 120 oppositely to the excitation coil 22 on the stator 116. The rotor housing 120 has formed on the outer surface thereof a turntable 17 on which the hard disc 3 is to be placed. The hard disc 3 is also supported at the inner circumference thereof between the turntable 17 and chucking member 18 pressed toward the turntable 17 to be rotatable along with the rotor housing 120.

According to the present invention, the bearing unit may be designed such that the shaft is rotatable or the housing is rotatable with the shaft being fixed, as above. That is to say, either of such designs of the bearing unit according to the present invention may appropriately be selected depending upon how a motor or the like using the bearing unit is constructed.

Note that in the bearing unit according to the present invention, if the housing to support the metallic shaft is formed from a synthetic resin which is electrically insulative, the static electricity charged on the shaft being rotated may not possibly be discharged positively to outside the bearing unit.

If such a bearing unit from which the static electricity developed due to the rotation of the shaft 51 cannot be discharged to outside is used in a disc drive unit, there will arise the following problems:

Since there is not provided any discharge means or path from the shaft as a rotating part of the bearing unit, the hard disc supported rotatably on the shaft will be charged with static electricity. For example, the magneto-resistive head to scan a hard disc and write or read information signal to or from the hard disc has a withstand voltage as low as 100 V or so, and will thus possibly be damaged by the static electricity.

On this account, when the bearing unit according to the present invention is used in a disc drive unit or the like which writes or reads information signal to or from a disc therein and from which any small influence of static electricity has to be removed, it should desirably be constructed to surely discharge static electricity developed on the rotating part to outside.

Next, a bearing unit from which static electricity developed due to the rotation of the shaft can be discharged to outside and a spindle motor using the bearing unit will be described.

Note that in the following illustration and explanation, the same or similar elements of the bearing unit and spindle motor as or to those in FIGS. 5 and 6 will be indicated with the same or similar references as in FIGS. 5 and 6, and will not be described in detail any longer.

Figure 24:
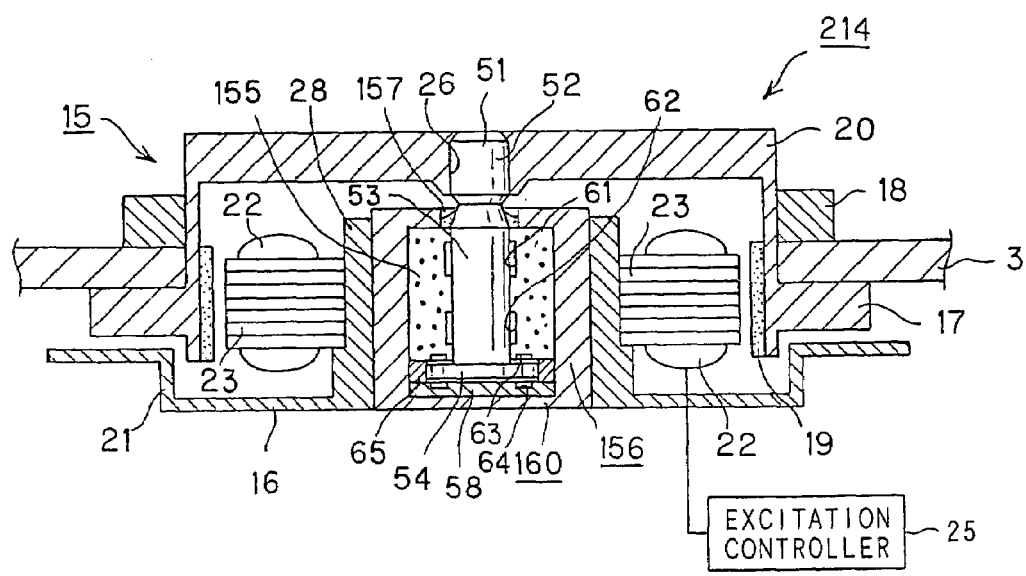
FIG. 24 is a sectional view of a spindle motor using a bearing unit provided with a static electricity discharge function.

The spindle motor is generally indicated with a reference 214. It employs a bearing unit generally indicated with a reference 160 from which static electricity developed due to the rotation of the shaft 51 can be discharged to outside the housing 56. As shown in FIG. 24, the spindle motor 214 is used in a disc drive unit like the spindle motor 4 having previously been described with reference to FIG. 5.

Figure 25:
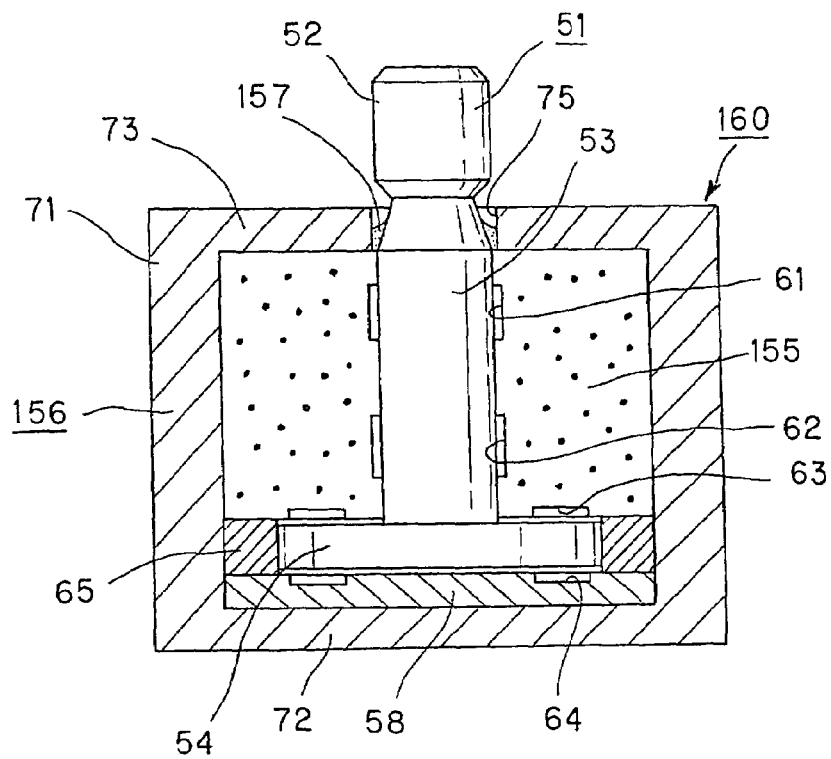
FIG. 25 is a sectional view of the bearing unit provided with the static electricity discharge function.

The spindle motor 214 shown in FIG. 24 uses the bearing unit 160 including a housing 156 formed from an electroconductive resin having a electroconductive material mixed therein and which is constructed as shown in FIG. 25. The electroconductive resin is polycarbonate, polyester, nylon, polyimide, liquid crystal or the like in which conductive carbon or metal powder is mixed. Also, a synthetic resin having electroconductive carbon nanotube mixed therein so as to be moldable with a high precision is used.

An electroconductive lubricant 157 is filled in the housing 156 formed from such an electroconductive resin. The lubricant 157 may be a machine oil such as esters, diesters, polyalphaolefin (PAO) or fluorinated compound in which an electroconductive material such as an electroconductive carbon compound is mixed.

The radial bearing 155 received in the housing 156 is formed from a sintered metal such as the above-mentioned electroconductive metal, brass or stainless steel.

Further, the shaft 51 received and held in the housing 156 is formed from an electroconductive metal such as stainless steel.

The bearing unit 160 formed from the above-mentioned material has a discharge path extending from the shaft 51 through the electroconductive lubricant 157 filled in the electroconductive housing 156 and radial bearing 55 to the housing 156 itself. That is, the bearing unit 160 has a discharge path along which static electricity developed when the shaft 51 rotates inside the housing 156 can be discharged to outside the housing 156.

In the spindle motor 214 using the bearing unit 160 having such a discharge path, static electricity developed due to the rotation of the shaft 51 can be discharged to the cylindrical portion 28 of the metallic stator housing 21 included in the stator 16 as shown in FIG. 24. Since in the spindle motor 214 using the bearing unit 160 according to the present invention, the static electricity developed when the shaft 51 rotates can be discharged to the stator housing 21, so it is possible to prevent the static electricity from being charged to the hard disc 3 through the turntable 17. Thus, it is possible to prevent the static electricity from being dis charged to the magnetic head to write or read information signal. Therefore, the magnetic head can surely be protected against damage.

To form a discharge path from the rotating shaft of the bearing unit to the stator housing of the spindle motor, an electroconductive lubricant 67 may be filled in the housing 56 of the bearing units 101 and 110 having previously been described with reference to FIGS. 14 and 15. The lubricant 67 will form a discharge path extending from the shaft 51 to outside the housing 56.

By using a bearing unit having formed therein a discharge path extending from the shaft to outside the housing, it is possible to positively protect the parts of a disc drive unit, such as a magnetic head and the like, without being influ enced by the static electricity.

Since in the bearing unit according to the present invention, provided with such a discharge path, the lubricant filled in the housing is prevented from leaking out as above, the magnetic head and hard disc in the disc drive unit will not be contaminated with any lubricant. So, the bearing unit according to the present invention allows to build a disc drive in which the magnetic head and hard disc can surely be protected and which can write and read information signal safely.

Further, another embodiment of the bearing unit according to the present invention will be illustrated and explained.

Like the bearing unit 30 having previously been described with reference to FIGS. 5 and 6, this embodiment of the bearing unit used with a spindle motor in a disc drive unit. The bearing unit is generally indicated with a reference 330. The same or similar elements of the bearing unit 330 as those in the bearing unit 30 and spindle motor 4 are indicated with the same or similar references to those in FIGS. 5 and 6, and will not be described in detail any longer.

Figure 26:
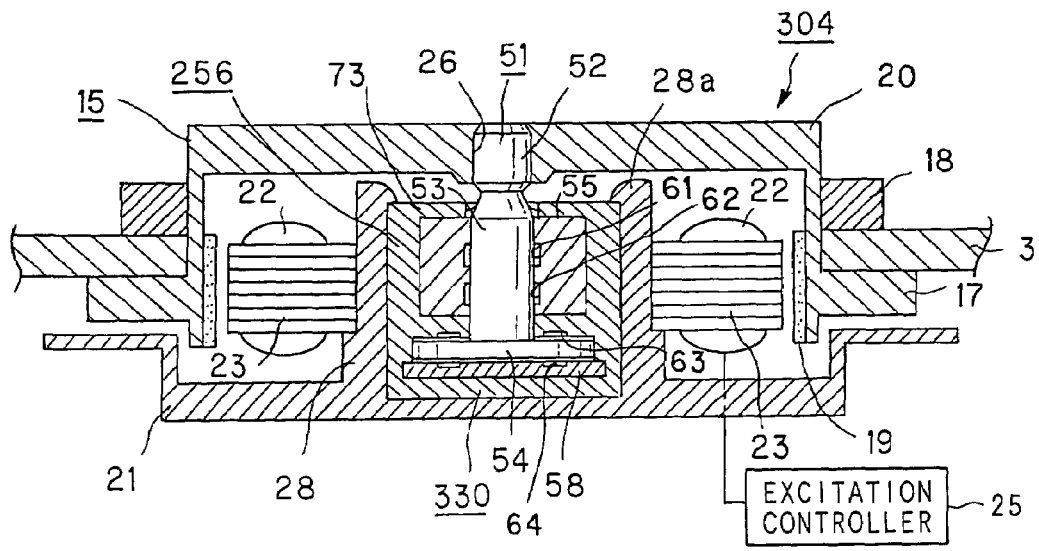
FIG. 26 is a sectional view of a spindle motor using the bearing unit according to the present invention.

As shown in FIG. 26, the bearing unit 330 is fitted in a cylindrical portion 28 of a stator housing 21 of a spindle motor 304. For this installation, the bearing unit 330 is positioned in relation to the stator housing 21 with a housing 256 thereof, through which a shaft 51 is projected to outside, being engaged at the outer surface of a top closing member 73 thereof on an engagement claw 28*a* formed at the top of the cylindrical portion 28.

Figure 27:
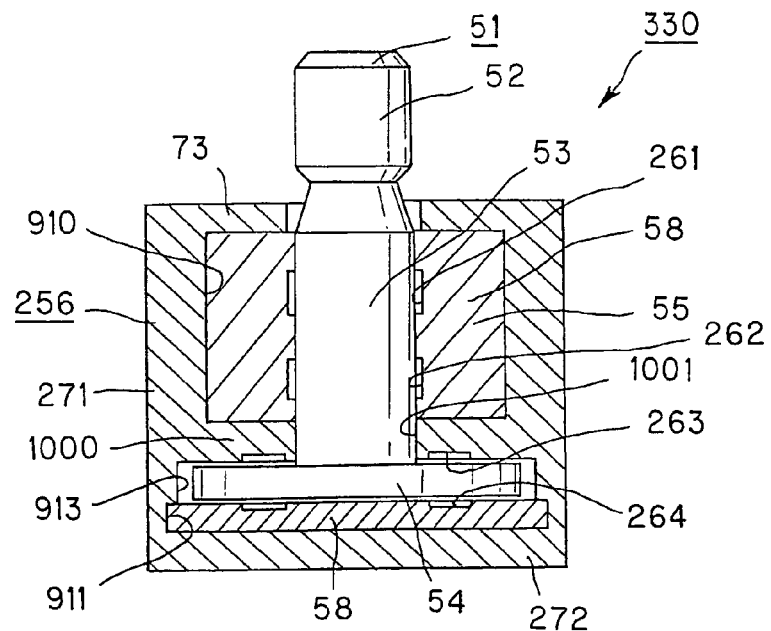
FIG. 27 is a sectional view of a variant of the bearing unit used in the spindle motor in FIG. 26.
Figure 28:
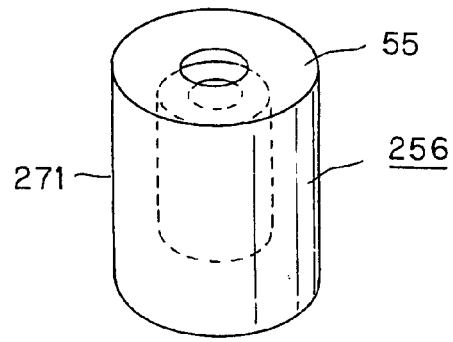
FIG. 28 is an exploded perspective view of the bearing unit with a housing having a partition member provided therein.
Figure 28:
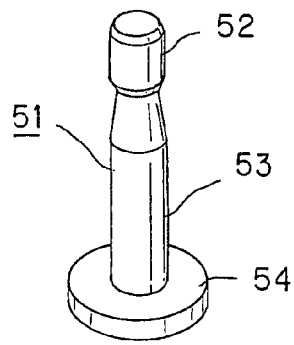
Figure 28:
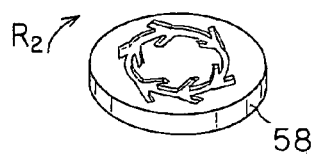

The bearing unit 330 includes the shaft 51 which also is the spindle of the spindle motor 304. The shaft 51 consists of a body 53 and a disc-shaped radial projection 54 formed one end of the shaft body 53 and having a larger diameter than the shaft body 53, as shown in FIGS. 27 and 28. Also, the shaft 51 includes, in addition to the shaft 51, a radial bearing 55 to support the shaft 51 circumferentially of the latter, a thrust shaft 58 to support the radial projection 54 in the thrusting direction of the shaft 51, and the housing 256 which receives and holds the radial and thrust bearings 55 and 58.

The housing 256 is formed from a synthetic resin, and includes a first compartment 910 to receive and hold the cylindrical radial bearing 55, a second compartment 911 to receive and hold the thrust bearing 58, and a radial projec tion compartment 913 to receive the radial projection 54 of the shaft 51. The second compartment 911 and radial pro jection compartment 913 are formed contiguously to each other. The first compartment 910 is smaller in inside diam eter than the second compartment 911, and the inside diameter of the radial projection compartment 913 is an intermediate one between the inside diameters of the first and second compartments 910 and 911.

In the first compartment 910, there is received and held the cylindrical radial bearing 55 as shown in FIG. 27. The second compartment 911 receives and holds the disc-shaped thrust bearing 58. In the radial projection compartment 913, the radial projection 54 of the shaft 51 is received to define small gaps with the surrounding walls.

Inside the housing 256, a partition member 1000 is provided along the inner surface of the housing 256 to project inwardly from the inner surface. The partition mem ber 1000 is provided in a position where the first and second compartments 910 and 911 are to be parted from each other. The partition member 1000 has formed in the center thereof a shaft insertion hole 1001 having a sufficient diameter to allow the body 53 of the shaft 51 to pass through. As shown in FIG. 27, the shaft 51 is disposed inside the housing 256 by inserting the shaft body 53 through the shaft insertion hole 1001 into the radial bearing 55 and projecting the fixing portion 52 out of the shaft insertion hole 75 formed in the top closing member 73. At this time, the radial projection 54 will be positioned in the radial projection compartment 913 and the thrust bearing 58 be received in the second compartment 911.

Figure 29:
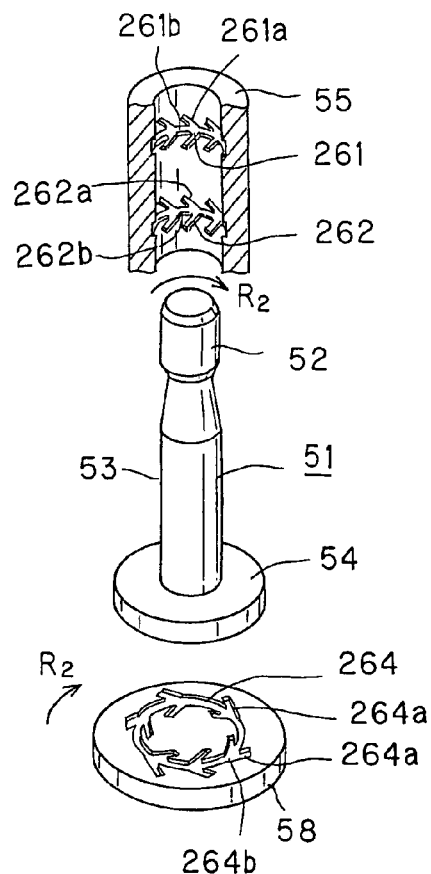
FIG. 29 is an exploded perspective view of the bearing unit, including also a fragmentary sectional view of the radial bearing.

As shown in FIG. 29, opposite to the outer surface of the shaft body 53, a pair of first dynamic pressure producing recesses 261 and 262 is formed in the inner surface of the radial bearing 55 which supports the shaft 51 received in the first compartment 910 in the housing 256 to be rotatable circumferentially of the shaft 51. The dynamic pressure producing recesses 261 and 262 are formed each as a herringbone-shaped recess which is a combination of pairs of recesses 261*a*, each pair forming a V shape, and a coupling recess 261*b* coupling the V-shaped pairs of recesses 261*a* with each other circumferentially of the radial bearing 55. These first dynamic pressure producing recesses 261 and 262 are formed such that the V shape of each pair of recesses 261*a* is directed at the bottom end thereof in a direction $R_2$ in which the shaft 51 rotates. In this embodi ment, the first dynamic pressure producing recesses 261 and 262 are formed in one pair, upper and lower, in parallel with each other perpendicularly to the axis of the cylindrical radial bearing 55.

Figure 30:
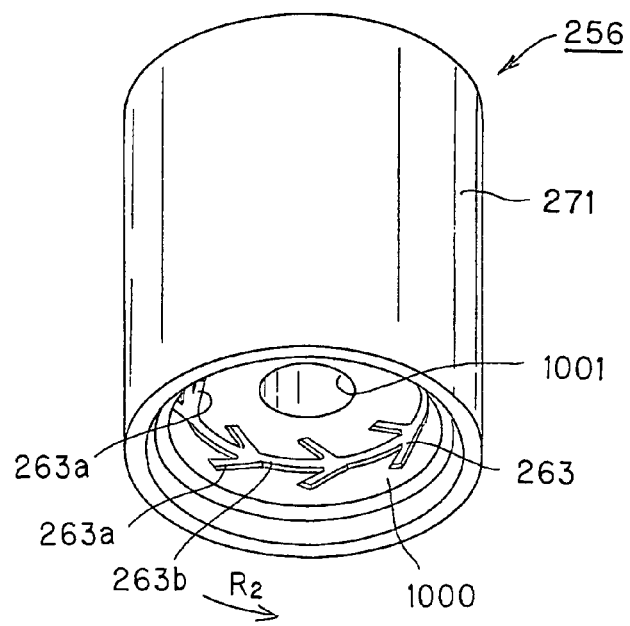
FIG. 30 is a perspective view of the partition member provided in the housing.

Also, on the side, opposite to the radial projection 54, of the partition member 1000 formed inside the housing 256 in which the shaft 51 is disposed, there is formed a second dynamic pressure producing recess 263 as shown in FIGS. 27 and 30. Also, this dynamic pressure producing recess 263 is formed along the outer circumference of the partition member 1000 in the form of a circular herringbone-shaped recess which is a combination of pairs of recesses 263a, each pair forming a V shape, and a coupling recess 263b coupling the V-shaped pairs of recesses 263a with each other circumferentially of the partition member 1000, as shown in FIG. 30. The second dynamic pressure producing recess 263 is formed such that the V shape of each pair of recesses 263a is directed at the bottom end thereof in a direction $R_2$ in which the shaft 51 rotates.

Further, on the side, opposite to the body 54 of the shaft 51, of the thrust bearing 58, there is formed a third dynamic pressure producing recess 264 as shown in FIGS. 28 and 29. Also, this third dynamic pressure producing recess 264 is formed along the outer circumference of the disc-shaped thrust bearing 58 in the form of a circular herringbone-shaped recess which is a combination of pairs of recesses 264a, each pair forming a V shape, and a coupling recess 264b coupling the V-shaped pairs of recesses 264a with each other circumferentially of the thrust bearing 58. The third dynamic pressure producing recess 264 is formed such that the V shape of each pair of recesses 264a is directed at the bottom end thereof in a direction $R_2$ in which the shaft 51 rotates.

When the shaft 51 is continuously rotated while being supported by the radial and thrust bearings 55 and 58, a lubricant 67 being a viscous fluid filled in the housing 56 is circulated through the first to third dynamic pressure producing recesses 261, 262, 263 and 264 to produce dynamic pressures between the shaft 51 and the radial and thrust bearings 55 and 58, respectively, which dynamic pressures supporting the shaft 51 being rotating. Say, the radial and thrust bearings 55 and 58 function as a dynamic-pressure fluid bearing. The dynamic pressure produced as the shaft 51 rotates minimizes the coefficient of a friction between the shaft 51 and the radial and thrust bearings 55 and 58, respectively, to thereby allow the shaft 51 to rotate smoothly.

Since the housing 256 and thrust bearing 58 included in the bearing unit 330 according to the present invention can be formed from a synthetic resin, the second dynamic pressure producing recess 263 formed in the partition member 1000 and third dynamic pressure producing recess 264 formed in the thrust bearing 58 can be formed very easily when forming the housing 256 and thrust bearing 58. These second and third dynamic pressure producing recesses 263 and 264 can be formed by molding. So, they can be formed more easily than when they are formed by cutting or otherwise processing a metallic material.

In the bearing unit 330 according to the present invention, the spacing between the partition member 1000 in which the second dynamic pressure producing recess 263 is formed and the radial projection 54 of the shaft 51 and that between the thrust bearing 58 in which the third dynamic pressure producing recesses 264 is formed and the radial projection 54 of the shaft 51 should desirably be formed as small as possible for the lubricant 67 to move convergently to the second and third dynamic pressure recesses 263 and 264 in order to produce a stable dynamic pressure when the shaft 51 is rotated.

The housing 256 of the bearing unit 330 according to the present invention can be formed by forming, for example, by out-sert molding, the bottom closing member 272 integrally with the housing body 271 having received therein the radial bearing 55, shaft 51 and thrust bearing 58. Since the bottom closing member 272 can be formed, by out-sert molding, integrally with the housing body 271, no mechanical assembling process is required and thus the bearing unit 330 can be made more easily.

Figure 31:
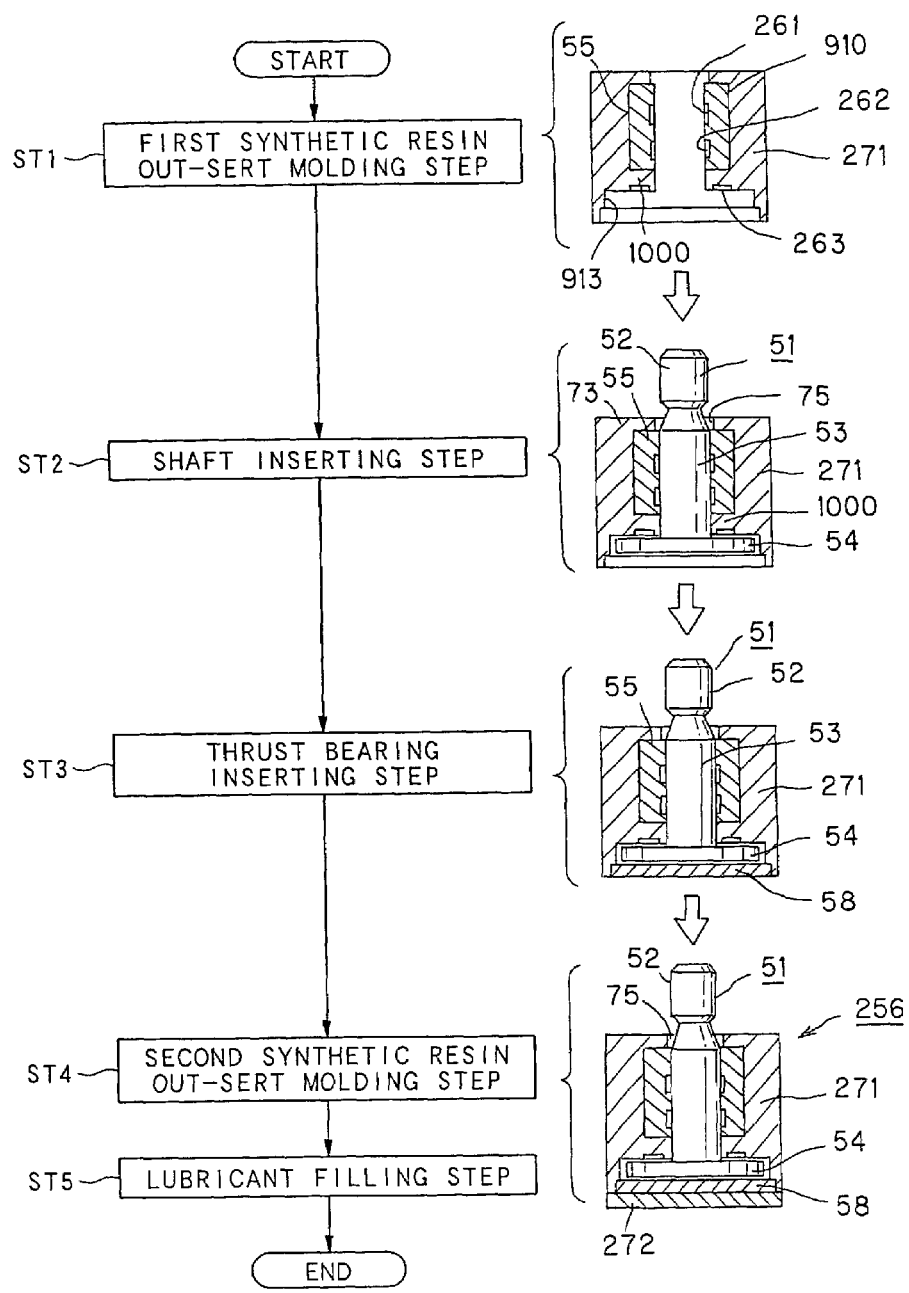
FIG. 31 shows a process of manufacturing the bearing unit via assembling the shaft to the housing having the partition member provided therein.

The process of manufacturing the bearing unit 330 will be explained herebelow with reference to FIG. 31.

The bearing unit 330 is manufactured through a first synthetic resin out-sert moving step ST1, T-shaped shaft inserting step ST2, thrust bearing inserting step ST3, second synthetic resin out-sert molding step ST4, lubricant filling step ST5, lubricant removing step and a filled-lubricant amount adjusting step.

In the first synthetic resin out-set molding step ST1, the housing 271 is formed, by out-sert molding, around the radial bearing 55.

To assure a good lubrication in the thrusting direction, the third dynamic pressure producing recess 264 should be formed in the form of a ring in the thrust bearing 58 coaxially with the shaft 51. The radial bearing 55 is received and held in the first compartment 910.

The second dynamic pressure producing recess 263 formed in the partition member 1000 of the housing 256 can be formed very easily since it can be formed along with the housing body 271 in the first synthetic resin out-sert molding step.

In the next step ST2 of inserting the shaft 51, the shaft 51 is inserted from the open bottom where the second compartment 911 in the housing body 271, in which the thrust bearing 58 is disposed. At this time, the shaft 51 is disposed inside the housing body 271 with the top fixing portion 52 thereof being projected out of the shaft insertion hole 75 formed in the top closing member 73 and the radial projection 54 being placed in the radial projection compartment 913.

In the next thrust bearing inserting step ST3, the thrust bearing 58 is inserted into the second compartment 911.

In the second synthetic resin out-sert molding step ST4, the bottom closing member 272 is formed by out-sert molding of an additional synthetic resin on the thrust bearing 58. Thus the housing 256 is closed and the thrust bearing 58 is held fixed inside the second compartment 911. Thereafter, in the lubricant filling step ST5, the lubricant is filled into the housing 256.

Thus, the housing 256 will encase the body 53 of the shaft 51, radial projection 54, radial bearing 55 and thrust bearing 58 integrally therein. The housing 256 is closed except for the shaft insertion hole 75 formed in the top closing member 73.

The thrust bearing 58 used in the bearing unit 330 has the dynamic pressure producing recess 264 formed therein to a depth and width of several micrometers by pressing, form rolling, etching and the like. Since the dynamic pressure producing recess 264 having a very small depth and width can be formed in forming the thrust bearing 58 also from a synthetic resin, so the bearing unit 330 can be made easily and with less costs.

By forming the thrust bearing 58 from a resin showing an excellent lubricity such as nylon or the like, the abrasion due to a contact between the shaft 51 just after rotating and the thrust bearing 58 can be reduced, and the bearing unit thus manufactured is highly reliable.

Also in the bearing unit 330 shown in FIGS. 26 and 27, there may be used the shaft 351 having the second and/or third dynamic pressure producing recess 363 and/or 364 formed in the disc 354 as shown in FIGS. 19 and 20.

In this case, no dynamic pressure producing recess has to be formed in both or in any of the partition member 1000 of the housing 256 and thrust bearing 58, with the result that the housing 256 or thrust bearing 58 can be made more easily.

In all the aforementioned bearing units according to the present invention, the maximum outside dimensions of the radial bearings and the outside dimensions of the radial projections should preferably identical to each other and a relatively small radial bearing and radial projection are used. Thus, the housing itself can be designed to have smaller outside dimensions.

The outside dimensions of the thrust bearing is somewhat larger than the maximum outside dimensions of the radial projection of the shaft and radial bearing. However, since the portion, having larger outside dimensions, of the radial bearing can be withdrawn into the radial wall thickness of the housing, the outside dimensions of the housing will not be increased correspondingly.

In all the aforementioned bearing units according to the present invention, the housing is closed except for small gaps at the shaft insertion hole formed in the top closing member, through which the shaft is inserted. That is to say, the housing has only the gap at the shaft insertion hole, which gap is sufficiently small to prevent the lubricant being a viscous fluid filled in the housing from leaking to outside the housing, and it is closed at the rest thereof. So, the bearing units according to the present invention are highly reliable with no possibility of the filled lubricant leaking or flying out of the housing. This is also true for the motor using such a bearing unit. Since the lubricant can be prevented from leaking or flying out, a hard disc will not possibly be stained with the lubricant and thus can be surely protected when the bearing unit is used with a spindle motor in a disc drive unit.

Further, since the bearing unit according to the present invention can be designed to have a structure in which the shaft is supported in the radial and thrusting directions by the dynamic-pressure fluid bearing, so it is an extremely low friction bearing unit which can allow the shaft to rotate with no loss of energy. Also, the shaft can be allowed to rotate stable with no run-out, and thus the bearing unit according to the present invention can advantageously be used with a high-speed spindle motor of a disc drive unit.

Note that although the aforementioned bearing units use a lubricant as a viscous fluid filled in the housing, the present invention is not limited to such a lubricant but any viscous fluid which has a constant viscosity and surface tension may be selected appropriately for use in the bearing unit.

The bearing unit according to the present invention cannot only be used as the bearing for a spindle motor of a disc drive unit but also as the bearing of a motor in a radiator or as the bearings of various types of motor.

Further, the bearing unit according to the present invention cannot only be used with a motor but can widely be used with a mechanism having a rotating shaft and a mechanism which supports a rotating member.

INDUSTRIAL APPLICABILITY

As having been described in the foregoing, the bearing unit according to the present invention can produce a dynamic pressure positively when the shaft is rotated and the dynamic pressure thus produced is stable, and so it allows the shaft or a member supported by the shaft to rotate stably and smoothly. Especially, since the bearing unit according to the present invention allows the shaft to rotate with a considerably reduced frictional resistance, so it can advantageously be used with a high-speed motor in a disc drive unit or the like.

The invention claimed is:

1. A bearing unit comprising:
  a shaft consisting of a body having a circular section and a disc-shaped radial projection formed on one end of the shaft body and having a larger diameter than the shaft body;
  a radial bearing to support the shaft circumferentially of the latter;
  a thrust bearing disposed opposite to the radial projection of the shaft to support the shaft at one of thrusting-directional ends of the latter;
  a housing having disposed therein the radial and thrust bearings which support together the shaft, filled with a viscous fluid, and having a closed structure except for a shaft insertion hole through which the shaft is introduced; and
  a spacer member disposed in the housing to keep a gap between the end face of the radial bearing and one side of the radial projection of the shaft;
  there being formed on either one side of the radial projection opposite to the end face of the radial bearing or the end face of the radial bearing opposite to the one side of the radial projection a dynamic pressure producing means for producing a dynamic pressure by the viscous fluid; and
  there being formed on either the side of the thrust bearing opposite to the other side of the radial projection or the other side of the radial projection a dynamic pressure producing means for producing a dynamic pressure by the viscous fluid.

2. The bearing unit as set forth in claim 1, wherein in the inner surface of the radial bearing opposite to the shaft, there is formed a third dynamic pressure producing means for producing a dynamic pressure by the viscous fluid.

3. The bearing unit as set forth in claim 1, wherein a gap defined between the shaft and inner surface of the shaft insertion hole is sufficiently small to prevent the viscous fluid filled in the housing from leaking out of the housing.

4. The bearing unit as set forth in claim 1, wherein the housing is formed as one piece by molding a synthetic resin.

5. The bearing unit as set forth in claim 1, wherein either the inner surface of the shaft insertion hole formed in the housing or the outer surface of the body of the shaft opposite to the inner surface of the shaft insertion hole is tapered to increase the gap defined between the outer surface of the shaft body and inner surface of the shaft insertion hole as the gap goes to outside the housing.

6. The bearing unit as set forth in claim 1, wherein the viscous fluid is filled in the housing up to at least the gap defined between the outer surface of the body of the shaft and inner surface of the shaft insertion hole.

7. The bearing unit as set forth in claim 1, wherein the spacer member is composed of a cylindrical portion which is to be fixed to the inner surface of the housing and a toroidal sleeve formed integrally with the cylindrical portion to project inwardly and radially of the cylindrical portion.

8. The bearing unit as set forth in claim 7, wherein
  the cylindrical portion of the spacer member is partially exposed to outside through a hole formed in the housing.

9. The bearing unit as set forth in claim 1, wherein the radial bearing and spacer member are formed integrally with each other.

10. The bearing unit as set forth in claim 1, wherein the housing and spacer member are formed integrally with each other.

11. The bearing unit as set forth in claim 1, wherein the shaft is a rotating shaft supported by the radial and thrust bearings rotatably in relation to the housing.

12. The bearing unit as set forth in claim 1, wherein the shaft is fixed while the housing is rotatable in relation to the shaft with the radial and thrust bearings interposed between the shaft and housing.

13. The bearing unit as set forth in claim 1, wherein the end portion of the housing in which the thrust bearing is disposed is formed from a synthetic resin and joined, by welding, to the housing body formed from the synthetic resin and in which the radial bearing is disposed.

14. The bearing unit as set forth in claim 13, wherein the welding is an ultrasound welding.

15. The bearing unit as set forth in claim 1, wherein the end portion of the housing in which the thrust bearing is disposed may be formed, by out-sert molding, on and integrally with the housing body in which the radial bearing is disposed.

16. The bearing unit as set forth in claim 15, wherein the end portion of the housing in which the thrust bearing is disposed is formed integrally with the housing body from a synthetic resin whose molding temperature is lower than a temperature the housing body in which the radial bearing is disposed can resist.

17. The bearing unit as set forth in claim 1, wherein the radial bearing is being formed from a sintered metal.

18. The bearing unit as set forth in claim 1, wherein the radial projection is formed from a synthetic resin and installed integrally to the shaft body.

19. The bearing unit as set forth in claim 1, wherein the radial projection is formed from a sintered metal and installed integrally to the shaft body.

20. The bearing unit as set forth in claim 1, wherein there is provided on the housing of the bearing unit a fixing means for mechanically fixing the housing to a counterpart object.

21. The bearing unit as set forth in claim 1, wherein the shaft, viscous fluid, radial bearing and housing form together a discharge path to outside the housing to discharge static electricity to outside.

22. The bearing unit as set forth in claim 21, wherein at least a part of the shaft and the radial bearing are formed from a metal.

23. The bearing unit as set forth in claim 21, wherein the housing is formed from an electroconductive synthetic resin.

24. The bearing unit as set forth in claim 21, wherein the viscous fluid has an electroconductive material mixed therein.

25. The bearing unit as set forth in claim 21, wherein the housing is formed from a synthetic resin and has a metal discharge member provided continuously over the inner and outer surfaces of at least a part thereof.

26. A bearing unit comprising:
a shaft consisting of a body having a circular section and a disc-shaped radial projection formed on one end of the shaft body and having a larger diameter than the shaft body;
a radial bearing to support the shaft circumferentially of the latter;
a thrust bearing disposed opposite to the radial projection of the shaft to support the shaft at one of thrusting-directional ends of the latter; and
a housing having disposed therein the radial and thrust bearings which support together the shaft, filled with a viscous fluid, and having a closed structure except for a shaft insertion hole through which the shaft is introduced;
the housing including a first compartment to receive and hold the radial bearing, a second compartment to receive and hold the thrust bearing, a radial projection compartment formed between the radial and thrust bearings to receive the radial projection of the shaft rotatably, and a partition member provided in a position where the first compartment and radial projection compartment are to be parted from each other; and
there being formed on either the side of the partition member opposite to the radial projection of the shaft or the side of the radial projection opposite to the partition member a dynamic pressure producing means for producing a dynamic pressure by the viscous fluid.

27. The bearing unit as set forth in claim 26, wherein on the inner surface of the radial bearing opposite to the shaft, there is formed a third dynamic pressure producing means for producing a dynamic pressure by the viscous fluid.

28. The bearing unit as set forth in claim 26, wherein there is formed on either the side of the thrust bearing opposite to the radial projection or the side of the radial projection opposite to the thrust bearing a dynamic pressure producing means for producing a dynamic pressure by the viscous fluid.

29. The bearing unit as set forth in claim 26, wherein a gap defined between the shaft and inner surface of the shaft insertion hole is sufficiently small to prevent the viscous fluid filled in the housing from leaking out of the housing.

30. The bearing unit as set forth in claim 26, wherein the shaft is a rotating shaft supported by the radial and thrust bearings rotatably in relation to the housing.

31. The bearing unit as set forth in claim 26, wherein the shaft is fixed while the housing isrotatable in relation to the shaft with the radial and thrust bearings interposed between the shaft and housing.

32. The bearing unit as set forth in claim 26, wherein the end portion of the housing in which the thrust bearing is disposed is formed integrally with the housing body from a synthetic resin whose molding temperature is lower than a temperature the housing body in which the radial bearing is disposed can resist.

33. The bearing unit as set forth in claim 32, wherein the welding is an ultrasound welding.

34. The bearing unit as set forth in claim 26, wherein the end portion of the housing in which the thrust bearing is disposed may be formed, by out-sert molding, on and integrally with the housing body in which the radial bearing is disposed.

35. A motor including a rotor and stator and provided with a bearing unit which supports the rotor rotatably in relation to the stator, the bearing unit included in the motor comprising:
a shaft consisting of a body having a circular section and a disc-shaped radial projection formed at one end of the shaft body and having a larger diameter than the shaft body;
a radial bearing to support the shaft circumferentially of the latter;

a thrust bearing disposed opposite to the radial projection of the shaft to support the shaft at one of thrusting-directional ends of the latter;

a housing having disposed therein the radial and thrust bearings which support together the shaft, filled with a viscous fluid, and having a closed structure except for a shaft insertion hole through which the shaft is introduced; and a spacer member disposed in the housing to keep a gap between the end face of the radial bearing and one side of the radial projection of the shaft;

there being formed on the end face of the radial bearing opposite to one side of the radial projection a first dynamic pressure producing means for producing a dynamic pressure by the viscous fluid; and there being formed on the side of the thrust bearing opposite to the other side of the radial projection a second dynamic pressure producing means for producing a dynamic pressure by the viscous fluid.

36. The motor as set forth in claim 35, wherein in the inner surface of the radial bearing opposite to the shaft, there is formed a third dynamic pressure producing means for producing a dynamic pressure by the viscous fluid.

37. The motor as set forth in claim 35, wherein a gap defined between the shaft and inner surface of the shaft insertion hole is sufficiently small to prevent the viscous fluid filled in the housing from leaking out of the housing.

38. The motor as set forth in claim 35, wherein the housing is formed as one piece by molding a synthetic resin.

39. The motor as set forth in claim 35, wherein either the inner surface of the shaft insertion hole formed in the housing or the outer surface of the body of the shaft opposite to the inner surface of the shaft insertion hole is tapered to increase the gap defined between the outer surface of the shaft body and inner surface of the shaft insertion hole as the gap goes to outside the housing.

40. The motor as set forth in claim 35, wherein the viscous fluid is filled in the housing up to at least the gap defined between the outer surface of the body of the shaft and inner surface of the shaft insertion hole.

41. The motor as set forth in claim 35, wherein the spacer member is composed of a cylindrical portion which is to be fixed to the inner surface of the housing and a toroidal sleeve formed integrally with the cylindrical portion to project inwardly and radially of the cylindrical portion.

42. The motor as set forth in claim 35, wherein the rotor is fixed to the shaft and rotates along with the shaft.

43. The motor as set forth in claim 35, the rotor is supported on the housing and rotates along with the housing.

44. A motor including a rotor and stator and provided with a bearing unit which supports the rotor rotatably in relation to the stator, the bearing unit included in the motor comprising:

a shaft consisting of a body having a circular section and a disc-shaped radial projection formed at one end of the shaft body and having a larger diameter than the shaft body;

a radial bearing to support the shaft circumferentially of the latter;

a thrust bearing disposed opposite to the radial projection of the shaft to support the shaft at one of thrusting-directional ends of the latter; and a housing having disposed therein the radial and thrust bearings which support together the shaft, filled with a viscous fluid, and having a closed structure except for a shaft insertion hole through which the shaft is introduced;

the housing including a first compartment to receive and hold the radial bearing, a second compartment to receive and hold the thrust bearing, a radial projection compartment formed between the radial and thrust bearings to receive the radial projection of the shaft rotatably, and a partition member provided in a position where the first compartment and radial projection compartment are to be parted from each other; and there being formed on the side of the partition member opposite to the radial projection of the shaft a dynamic pressure producing means for producing a dynamic pressure by the viscous fluid.

45. The motor as set forth in claim 44, wherein in the inner surface of the radial bearing opposite to the shaft, there is formed a third dynamic pressure producing means for producing a dynamic pressure by the viscous fluid.

46. The motor as set forth in claim 44, wherein on the side of the thrust bearing opposite to the radial projection, there is formed a dynamic pressure producing means for producing a dynamic pressure by the viscous fluid.

* * * * *